United States Patent
Luo et al.

(10) Patent No.: US 10,359,129 B2
(45) Date of Patent: *Jul. 23, 2019

(54) AUTOMOTIVE FUEL LINES INCLUDING A POLYARYLENE SULFIDE

(71) Applicant: Ticona LLC, Florence, KY (US)

(72) Inventors: Rong Luo, Florence, KY (US); Xinyu Zhao, Cincinnati, OH (US); Joseph Grenci, Florence, KY (US)

(73) Assignee: Ticona LLC, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/350,178

(22) Filed: Nov. 14, 2016

(65) Prior Publication Data

US 2017/0059062 A1    Mar. 2, 2017

Related U.S. Application Data

(62) Division of application No. 13/804,573, filed on Mar. 14, 2013, now Pat. No. 9,494,262.

(Continued)

(51) Int. Cl.
*F16L 11/04*    (2006.01)
*B29C 47/06*    (2006.01)
(Continued)

(52) U.S. Cl.
CPC .......... *F16L 11/04* (2013.01); *B29C 47/0026* (2013.01); *B29C 47/0054* (2013.01);
(Continued)

(58) Field of Classification Search
CPC ...... C08L 81/02; C08L 81/04; C08L 23/0884; C08L 33/068; C08L 63/00; F16L 11/00;
(Continued)

(56) References Cited

U.S. PATENT DOCUMENTS 3,354,129 A    11/1967    Edmonds, Jr. et al.
3,610,698 A    10/1971    Gachot et al.
(Continued)

FOREIGN PATENT DOCUMENTS

CA    2032370    6/1991
EP    0900650    3/1999
(Continued)

OTHER PUBLICATIONS

Chun et al., "An Experimental Course of Organic Polymeric Materials," Central South University Press, $1^{st}$ Edition in 2009-0, p. 81; partial translation of p. 81 (section highlighted).
(Continued)

*Primary Examiner* — Yan Lan
(74) *Attorney, Agent, or Firm* — Dority & Manning, P.A.

(57) ABSTRACT

A fuel line comprising a thermoplastic composition is described. The thermoplastic compositions exhibit high strength and flexibility and can be used to form one or more layers of single layer or multi-layer fuel lines. Methods for forming the thermoplastic compositions are also described. Formation methods include dynamic vulcanization of a composition that includes an impact modifier dispersed throughout a polyarylene sulfide. A crosslinking agent is combined with the other components of the composition following dispersal of the impact modifier. The crosslinking agent reacts with the impact modifier to form crosslinks within and among the polymer chains of the impact modifier. The compositions can exhibit excellent physical characteristics at extreme temperatures.

21 Claims, 10 Drawing Sheets

Related U.S. Application Data

(60) Provisional application No. 61/717,955, filed on Oct. 24, 2012, provisional application No. 61/707,380, filed on Sep. 28, 2012, provisional application No. 61/703,331, filed on Sep. 20, 2012, provisional application No. 61/678,370, filed on Aug. 1, 2012, provisional application No. 61/665,423, filed on Jun. 28, 2012, provisional application No. 61/623,618, filed on Apr. 13, 2012.

(51) Int. Cl.

| | | |
|---|---|---|
| *B29C 47/82* | (2006.01) | |
| *B32B 27/28* | (2006.01) | |
| *B32B 1/08* | (2006.01) | |
| *B32B 27/08* | (2006.01) | |
| *B29C 47/00* | (2006.01) | |
| *B29C 47/92* | (2006.01) | |
| *B29C 48/10* | (2019.01) | |
| *B29C 48/00* | (2019.01) | |
| *B29C 48/18* | (2019.01) | |
| *B29C 48/21* | (2019.01) | |
| *B29C 48/92* | (2019.01) | |
| *B29C 48/875* | (2019.01) | |
| *B29C 47/80* | (2006.01) | |
| *B32B 27/18* | (2006.01) | |
| *B29C 48/09* | (2019.01) | |
| *B29K 81/00* | (2006.01) | |
| *B29K 105/00* | (2006.01) | |
| *B29L 31/30* | (2006.01) | |

(52) U.S. Cl.
CPC ............ *B29C 47/06* (2013.01); *B29C 47/065* (2013.01); *B29C 47/807* (2013.01); *B29C 47/827* (2013.01); *B29C 47/92* (2013.01); *B29C 48/0017* (2019.02); *B29C 48/10* (2019.02); *B29C 48/18* (2019.02); *B29C 48/21* (2019.02); *B29C 48/875* (2019.02); *B29C 48/92* (2019.02); *B32B 1/08* (2013.01); *B32B 27/08* (2013.01); *B32B 27/18* (2013.01); *B32B 27/286* (2013.01); *B29C 47/0023* (2013.01); *B29C 48/09* (2019.02); *B29C 2947/92514* (2013.01); *B29C 2947/92704* (2013.01); *B29C 2947/92876* (2013.01); *B29C 2948/92514* (2019.02); *B29C 2948/92704* (2019.02); *B29C 2948/92876* (2019.02); *B29K 2081/04* (2013.01); *B29K 2105/0005* (2013.01); *B29K 2995/007* (2013.01); *B29K 2995/0016* (2013.01); *B29K 2995/0077* (2013.01); *B29K 2995/0082* (2013.01); *B29K 2995/0089* (2013.01); *B29L 2031/30* (2013.01); *B32B 2307/306* (2013.01); *B32B 2307/3065* (2013.01); *B32B 2307/50* (2013.01); *B32B 2307/536* (2013.01); *B32B 2307/54* (2013.01); *B32B 2307/546* (2013.01); *B32B 2307/558* (2013.01); *B32B 2597/00* (2013.01); *B32B 2605/00* (2013.01); *Y10T 428/139* (2015.01); *Y10T 428/1393* (2015.01)

(58) Field of Classification Search
CPC . F16L 9/133; F16L 9/147; F16L 11/04; F16L 11/083; F16L 11/085; F16L 2011/047; F16L 57/04; F16L 57/06; F16L 58/04; Y10T 428/1352; Y10T 428/1379; Y10T 428/2958; B32B 1/08; B32B 2307/306; B32B 2307/3065; B32B 2307/50; B32B 2307/536; B32B 2307/54; B32B 2307/546; B32B 2307/558; B32B 2597/00; B32B 2605/00; B32B 27/08; B32B 27/18; B32B 27/286; B32B 15/08; B32B 2262/0269; B32B 2270/00; B32B 2274/00; B32B 2307/7242; B32B 2307/7265; B32B 2439/40; B32B 25/08; B32B 25/14; B32B 25/16; B32B 2605/08; B32B 27/12; B32B 27/20; B32B 27/304; B32B 27/32; B32B 27/34; B32B 5/022; B32B 5/024; B32B 5/026; B32B 5/142; B32B 7/12; B60K 15/03177; B65D 1/0215; B65D 25/14; B65D 31/04
USPC .................. 428/34.1, 35.7, 36.92, 36.9, 389; 523/400; 525/189
See application file for complete search history.

(56) References Cited

U.S. PATENT DOCUMENTS

| | | |
|---|---|---|
| 3,919,177 A | 11/1975 | Campbell |
| 4,337,329 A | 6/1982 | Kubo et al. |
| 4,368,321 A | 1/1983 | Sherk et al. |
| 4,371,671 A | 2/1983 | Anderson |
| 4,384,081 A | 5/1983 | Kubo et al. |
| 4,452,951 A | 6/1984 | Kubo et al. |
| 4,464,515 A | 8/1984 | Rempel et al. |
| 4,503,196 A | 3/1985 | Rempel et al. |
| 4,581,417 A | 4/1986 | Buding et al. |
| 4,689,365 A | 8/1987 | Chacko et al. |
| 4,814,430 A | 3/1989 | Iwasaki et al. |
| 4,889,893 A | 12/1989 | Kobayashi et al. |
| 5,006,605 A | 4/1991 | Mizuno et al. |
| 5,015,704 A | 5/1991 | Takekoshi et al. |
| 5,038,833 A | 8/1991 | Brunnnhofer |
| 5,047,465 A | 9/1991 | Auerbach |
| 5,087,666 A | 2/1992 | Yu et al. |
| 5,149,731 A | 9/1992 | Uota et al. |
| 5,240,973 A | 8/1993 | Katoh et al. |
| 5,240,988 A | 8/1993 | Kohler et al. |
| 5,248,730 A | 9/1993 | Yamao |
| 5,270,305 A | 12/1993 | Palmer |
| 5,380,783 A | 1/1995 | Satake et al. |
| 5,397,839 A | 3/1995 | Patel |
| 5,476,120 A | 12/1995 | Brunnnhofer |
| 5,504,141 A | 4/1996 | Collard et al. |
| 5,578,679 A | 11/1996 | Suzuki et al. |
| 5,589,544 A | 12/1996 | Horrion |
| 5,625,002 A | 4/1997 | Kadoi et al. |
| 5,652,287 A | 7/1997 | Sullivan |
| 5,654,358 A | 8/1997 | Kadoi et al. |
| 5,668,214 A | 9/1997 | Suzuki |
| 5,718,957 A | 2/1998 | Yokoe et al. |
| 5,817,723 A | 10/1998 | Flexman, Jr. et al. |
| 5,830,965 A | 11/1998 | Imaizumi et al. |
| 5,837,758 A | 11/1998 | Brown et al. |
| 5,840,830 A | 11/1998 | Miyahara et al. |
| 5,919,326 A | 7/1999 | Yokoe et al. |
| 6,001,934 A * | 12/1999 | Yamanaka ............ C08G 75/029 525/146 |
| 6,015,858 A | 1/2000 | Gornowicz |
| 6,020,431 A | 2/2000 | Venkataswamy et al. |
| 6,117,950 A | 9/2000 | Yamao et al. |
| 6,176,268 B1 | 1/2001 | Hsich et al. |
| 6,225,416 B1 | 5/2001 | Reil et al. |
| 6,281,286 B1 | 8/2001 | Chorvath et al. |
| 6,305,900 B1 * | 10/2001 | Yu ............................ F04D 5/002 415/55.1 |
| 6,362,287 B1 | 3/2002 | Chorvath et al. |
| 6,417,293 B1 | 7/2002 | Chorvath et al. |
| 6,443,185 B1 | 9/2002 | Katayama et al. |
| 6,446,673 B1 | 9/2002 | Iio et al. |
| 6,523,576 B2 | 2/2003 | Imaeda et al. |
| 6,538,071 B1 | 3/2003 | Fuchs |
| 6,569,955 B1 | 5/2003 | Brewer et al. |
| 6,569,958 B1 | 5/2003 | Gross et al. |
| 6,602,565 B1 | 8/2003 | Katayama et al. |

(56) References Cited

U.S. PATENT DOCUMENTS

| | | |
|---|---|---|
| 6,608,136 B1 | 8/2003 | Dean et al. |
| 6,619,330 B2 | 9/2003 | Ito et al. |
| 6,637,465 B2 | 10/2003 | Ito et al. |
| 6,649,704 B2 | 11/2003 | Brewer et al. |
| 6,653,437 B2 | 11/2003 | Hinokimori et al. |
| 6,657,014 B1 | 12/2003 | Mori et al. |
| 6,699,946 B1 * | 3/2004 | Lambla .......... C08L 81/02 525/189 |
| 6,713,569 B2 | 3/2004 | Chorvath et al. |
| 6,740,707 B2 | 5/2004 | Ono et al. |
| 6,740,709 B2 | 5/2004 | Ono et al. |
| 6,743,868 B2 | 6/2004 | Fournier et al. |
| 6,849,697 B2 | 2/2005 | Lambla et al. |
| 6,875,517 B2 | 4/2005 | Bosshammer et al. |
| 6,888,719 B1 | 5/2005 | Janzen et al. |
| 6,923,845 B2 | 8/2005 | Nichols et al. |
| 6,988,442 B2 | 1/2006 | Fisher |
| 7,011,114 B2 | 3/2006 | Suzuki et al. |
| 7,041,741 B2 | 5/2006 | Patel et al. |
| 7,059,365 B2 | 6/2006 | O'Connell |
| 7,086,420 B2 | 8/2006 | Kahn et al. |
| 7,208,207 B2 | 4/2007 | Ono et al. |
| 7,442,744 B2 | 10/2008 | Tokushige et al. |
| 7,807,245 B2 | 10/2010 | Bersted et al. |
| 7,960,473 B2 | 6/2011 | Kobayashi et al. |
| 7,981,981 B2 | 7/2011 | Ajbani et al. |
| 2004/0058111 A1 | 3/2004 | Manas-Zloczower et al. |
| 2005/0089688 A1 | 4/2005 | Mungioli et al. |
| 2005/0208248 A1 | 9/2005 | Ilo et al. |
| 2006/0151038 A1 | 7/2006 | Gregrich |
| 2006/0229417 A1 | 10/2006 | Ferrate et al. |
| 2008/0120968 A1 | 5/2008 | Beall et al. |
| 2009/0061134 A1 | 3/2009 | Ajbani et al. |
| 2010/0004375 A1 | 1/2010 | Lalgudi et al. |
| 2010/0048777 A1 | 2/2010 | Kodama et al. |
| 2010/0050606 A1 | 3/2010 | Fulks et al. |
| 2011/0226375 A1 | 9/2011 | Harris et al. |
| 2011/0287201 A1 | 11/2011 | Abe et al. |
| 2012/0037397 A1 | 2/2012 | Mhetar |
| 2013/0059976 A1 | 3/2013 | Matsuo et al. |
| 2013/0273286 A1 | 10/2013 | Luo et al. |
| 2013/0273287 A1 | 10/2013 | Luo et al. |
| 2013/0273288 A1 | 10/2013 | Luo et al. |
| 2013/0273290 A1 | 10/2013 | Luo et al. |
| 2015/0064437 A1 | 3/2015 | Luo et al. |
| 2015/0072093 A1 | 3/2015 | Zhang et al. |
| 2016/0109040 A1 * | 4/2016 | Ruby .......... F16L 9/147 138/144 |
| 2017/0121525 A1 * | 5/2017 | Luo .......... C08L 81/04 |
| 2017/0369705 A1 * | 12/2017 | Luo .......... C08L 81/04 |

FOREIGN PATENT DOCUMENTS

| | | |
|---|---|---|
| EP | 2239135 A1 | 10/2010 |
| EP | 2418255 | 2/2012 |
| FR | 2617176 | 12/1988 |
| GB | 1558491 | 1/1980 |
| JP | WO 91/18055 | 11/1991 |
| JP | 06-65376 A | 3/1994 |
| JP | 09-59514 A | 3/1997 |
| JP | 11-124476 A | 5/1999 |
| JP | 2001-115020 A | 4/2001 |
| JP | 2001-279097 A | 10/2001 |
| JP | 2004-300270 A | 10/2004 |
| JP | 3618018 B | 2/2005 |
| JP | 2006063255 A | 3/2006 |
| JP | 3889122 B | 3/2007 |
| JP | 2007-169550 A | 7/2007 |
| JP | 4235893 B | 3/2009 |
| JP | 4552434 B | 9/2010 |
| JP | 4600015 B | 12/2010 |
| JP | 4600016 B | 12/2010 |
| JP | 2011-020401 A | 2/2011 |
| JP | 5029881 B | 9/2012 |
| JP | 5051428 B | 10/2012 |
| WO | WO 94/16018 | 7/1994 |

OTHER PUBLICATIONS

Guizhi et al., "New Experiments of University's Chemistry," China Environmental Science Press, 1$^{st}$ Edition in Dec. 2011, p. 183, partial translation of p. 184 (section highlighted).

Han Zhewen, "Experiments of Polymer Science," East China University of Science and Technology Press, Feb. 2005, p. 204, partial translation of p. 204 (section highlighted).

Zhongzhen et al, "Testing of Properties of Plastics," China Light Industry Press, 1$^{st}$ Edition in Sep. 2009, p. 40, partial translation of p. 40 (section highlighted).

Huang Rui, "Plastics Engineering Handbook," Mechanical Industry press, 1$^{st}$ Edition in Apr. 2000, p. 580, partial translation of p. 80 (section highlighted).

\* cited by examiner

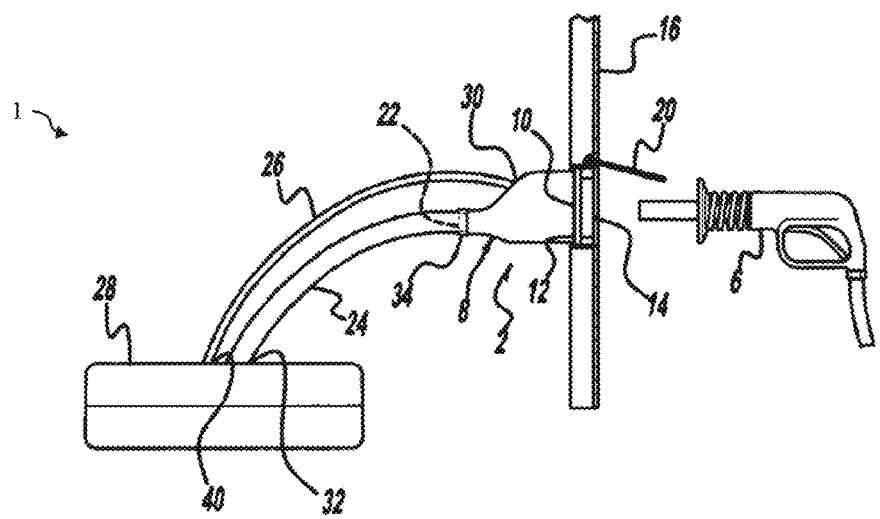
FIG. 1
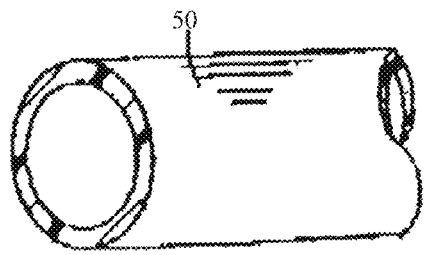
FIG. 2
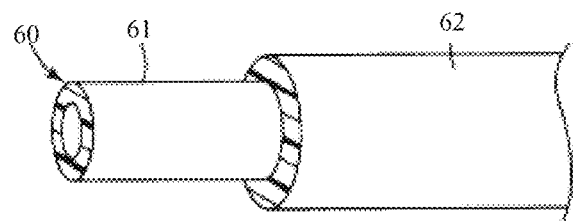
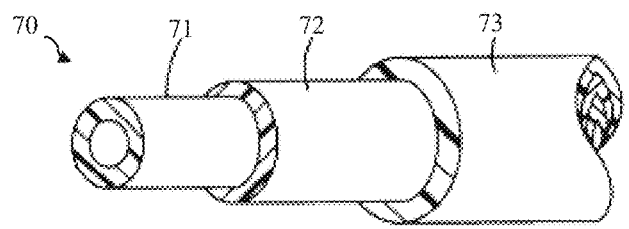
FIG. 4
FIG. 3

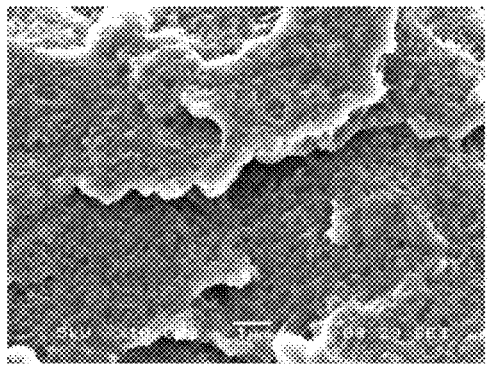 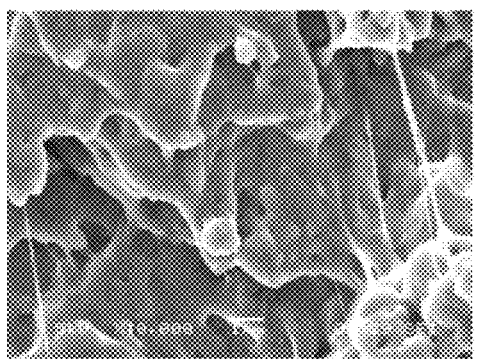
FIG. 9A (Sample 3)    FIG. 9B (Sample 6)
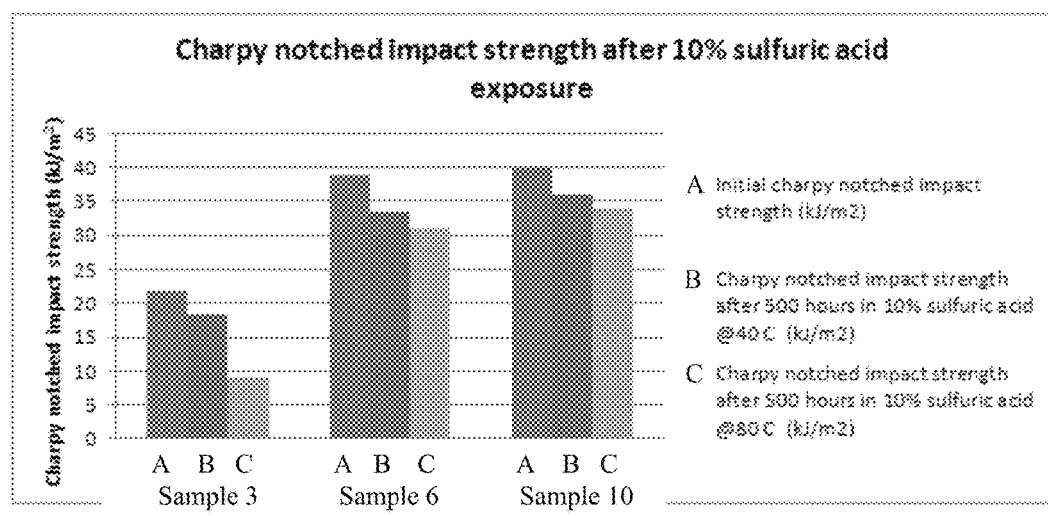
FIG. 10

AUTOMOTIVE FUEL LINES INCLUDING A POLYARYLENE SULFIDE

CROSS REFERENCE TO RELATED APPLICATIONS

The present application is a continuation of U.S. application Ser. No. 13/804,573 having a filing date of Mar. 14, 2013, which claims filing benefit of U.S. Provisional Patent Application Ser. No. 61/623,618 having a filing date of Apr. 13, 2012; U.S. Provisional Patent Application Ser. No. 61/665,423 having a filing date of Jun. 28, 2012; U.S. Provisional Patent Application Ser. No. 61/678,370 having a filing date of Aug. 1, 2012; U.S. Provisional Patent Application Ser. No. 61/703,331 having a filing date of Sep. 20, 2012; U.S. Provisional Patent Application Ser. No. 61/707,380 having a filing date of Sep. 28, 2012, and U.S. Provisional Patent Application Ser. No. 61/717,955 having a filing date of Oct. 24, 2012, all of which are incorporated herein by reference in their entirety.

BACKGROUND OF THE INVENTION

Automotive fuel line tubing and hoses include both monolayer and multilayer materials. Traditionally, metals were used to form fuel lines, but automotive manufacturers have been replacing metals wherever possible to reduce weight and $CO_2$ emissions. More recently, fuel line tubing and hoses have been formed of aliphatic polyamide (PA), high-heat rubber composites, and braided polytetrafluoroethylene (PTFE). Unfortunately, these materials have often provided less than ideal performance and/or required complex and costly formation techniques. For example, while braided PTFE and high heat rubber composites can be used in high heat environments, the constructions are often complex and costly. The use of aliphatic polyamide also has limitations. For instance, PA12 has limitations with regard to both permeation of fuel and long term heat aging at the higher temperatures present in newer vehicles. Thus, fuel lines formed of these materials often require a heat shield at added weight and cost. In addition, multi-layer constructions of these materials are often subject to delamination, especially where fluoropolymer layers are present, and generally require special chemical bonding between layers.

There are multiple different requirements for the lines in the fuel system, some of them varying depending upon the final application. For example, in the vapor line, a good barrier property must be provided to prevent vapors from escaping into the environment. In addition, there are thermal and mechanical requirements that should be maintained over a long lifetime. Included in the mechanical requirements are sufficient flexibility and impact strength for both fabrication and safety. In addition to the requirements for vapor lines, liquid lines also meet the requirement that essentially no materials used in forming the fuel line contaminate the fuel, which could lead to problems such as clogged fuel injectors. Thus, the lines must be chemically resistant to the liquids to be carried by the lines. Many polymers that have been examined for use in forming fuel lines to date have leached oligomers that can clog the fuel system and reduce engine performance.

Polyarylene sulfides are high-performance polymers that may withstand high thermal, chemical, and mechanical stresses and are beneficially utilized in a wide variety of applications. Polyarylene sulfides have often been blended with other polymers to improve characteristics of the product composition. For example, elastomeric impact modifiers have been found beneficial for improvement of the physical properties of thermoplastic compositions. Compositions including blends of polyarylene sulfides with impact modifying polymers have been considered for high performance, high temperature applications.

Unfortunately, elastomeric polymers generally considered useful for impact modification are not compatible with polyarylene sulfides and phase separation has been a problem in forming compositions of the two. Attempts have been made to improve the composition formation, for instance through the utilization of compatibilizers. However, even upon such modifications, compositions including polyarylene sulfides in combination with impact modifying polymers still fail to provide product performance as desired, particularly in applications that require both high heat resistance and high impact resistance.

What are needed in the art are thermoplastic compositions that can be used to form automotive fuel lines that exhibit excellent barrier properties as well as good mechanical characteristics, including both good impact resistance and good flexibility, so as to form fuel lines that can be quickly and easily installed and that can exhibit desirable characteristics over a long working life.

SUMMARY OF THE INVENTION

Disclosed in one embodiment is a fuel line that includes a thermoplastic composition. The thermoplastic composition includes a polyarylene sulfide and a crosslinked impact modifier. A fuel line as described herein is a tubular member including a hollow passage therethrough for passage of a fluid.

Also disclosed is a method for forming a fuel line. The method can include molding the thermoplastic composition including a polyarylene sulfide and a crosslinked impact modifier according to any of a variety of techniques to form a fuel line.

Fuel lines as may be formed from the thermoplastic composition can be either single layer tubes or multi-layer hoses. In addition, fuel lines encompassed herein can include fuel lines for use in carrying liquid fuel, vaporous fuel, or a combination thereof.

BRIEF DESCRIPTION OF THE FIGURES

The present disclosure may be better understood with reference to the following figures:

FIG. 1 illustrates a portion of a fuel system that can incorporate one or more fuel lines as described herein.

FIG. 2 is a single layer tube as may be formed from the thermoplastic composition.

FIG. 3 is a two layer hose, one or more layers of which may be formed from the thermoplastic composition.

FIG. 4 is a three layer hose, one or more layers of which may be formed from the thermoplastic composition.

FIG. 9 is a scanning electron microscope image of a thermoplastic composition as described herein (FIG. 9B) and a comparison thermoplastic composition (FIG. 9A).

FIG. 10 compares the effect of sulfuric acid exposure on strength characteristics of thermoplastic compositions as described herein and a comparison composition.

DETAILED DESCRIPTION

Figure 5:
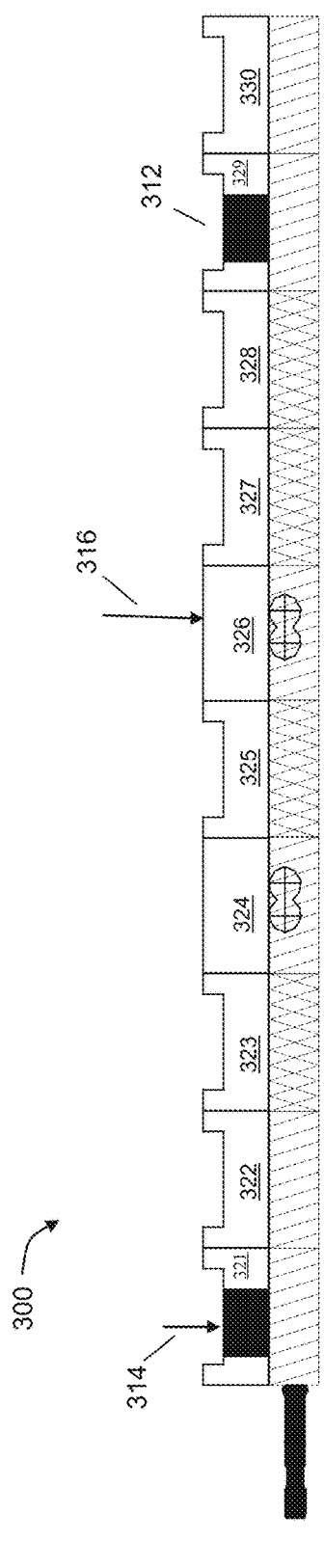
FIG. 5 is a schematic representation of a process for forming the thermoplastic composition.

It is to be understood by one of ordinary skill in the art that the present discussion is a description of exemplary embodiments only, and is not intended as limiting the broader aspects of the present disclosure.

The present disclosure is generally directed to fuel lines that include a thermoplastic composition that exhibits excellent strength and flexibility characteristics as well as resistance to chemical degradation due to contact with materials that may be carried within the fuel lines as well as materials that may contact the external surface of the fuel lines such as water, oils, gasoline, gases, synthetic or natural chemicals, etc. Beneficially, the thermoplastic composition can maintain good physical characteristics even when utilized in extreme temperature applications and can also maintain good physical characteristics under the motive forces that will be encountered over the lifetime of the fuel line.

The thermoplastic composition can be formed according to a melt processing technique that includes combining a polyarylene sulfide with an impact modifier to form a mixture and subjecting the mixture to dynamic vulcanization. More specifically, the polyarylene sulfide can be combined with the impact modifier and this mixture can be subjected to shear conditions such that the impact modifier becomes well distributed throughout the polyarylene sulfide. Following formation of the mixture, a polyfunctional crosslinking agent can be added. The polyfunctional crosslinking agent can react with the components of the mixture to form crosslinks in the composition, for instance within and between the polymer chains of the impact modifier.

Without being bound to any particular theory, it is believed that by adding the polyfunctional crosslinking agent following distribution of the impact modifier throughout the polyarylene sulfide, interaction between the polyarylene sulfide, the impact modifier, and the crosslinking agent within the melt processing unit can be improved, leading to improved distribution of the crosslinked impact modifier throughout the composition. The improved distribution of the crosslinked impact modifier throughout the composition can improve the strength and flexibility characteristics of the composition, e.g., the ability of the composition to maintain strength under deformation, as well as provide a composition with good processability that can be utilized to form a fuel line that can exhibit excellent resistance to degradation under a variety of conditions.

The high strength and flexibility characteristics of the thermoplastic composition can be evident by examination of the tensile, flexural, and/or impact properties of the materials. For example, the thermoplastic composition can have a notched Charpy impact strength of greater than about 3 kJ/m$^2$, greater than about 3.5 kJ/m$^2$, greater than about 5 kJ/m$^2$, greater than about 10 kJ/m$^2$, greater than about 15 kJ/m$^2$, greater than about 30 kJ/m$^2$, greater than about 33 kJ/m$^2$ greater than about 40 kJ/m$^2$, greater than about 45 kJ/m$^2$, or greater than about 50 kJ/m$^2$ as determined according to ISO Test No. 179-1 (technically equivalent to ASTM D256, Method B) at 23° C. The unnotched Charpy samples do not break under testing conditions of ISO Test No. 180 at 23° C. (technically equivalent to ASTM D256).

Beneficially, the thermoplastic composition can maintain good physical characteristics even at extreme temperatures, including both high and low temperatures. For instance, the thermoplastic composition can have a notched Charpy impact strength of greater than about 8 kJ/m$^2$, greater than about 9 kJ/m$^2$, greater than about 10 kJ/m$^2$, greater than about 14 kJ/m$^2$, greater than about 15 kJ/m$^2$, greater than about 18 kJ/m$^2$, or greater than about 20 kJ/m$^2$ as determined according to ISO Test No. 179-1 at −30° C.; and can have a notched Charpy impact strength of greater than about 8 kJ/m$^2$, greater than about 9 kJ/m$^2$, greater than about 10 kJ/m$^2$, greater than about 11 kJ/m$^2$, greater than about 12 kJ/m$^2$, or greater than about 15 kJ/m$^2$ as determined according to ISO Test No. 179-1 at −40° C.

Moreover, the effect of temperature change on the thermoplastic composition can be surprisingly small. For instance, the ratio of the notched Charpy impact strength as determined according to ISO Test No. 179-1 at 23° C. to that at −30° C. can be greater than about 3.5, greater than about 3.6, or greater than about 3.7. Thus, and as described in more detail in the example section below, as the temperature increases the impact strength of the thermoplastic composition also increases, as expected, but the rate of increase of the impact strength is very high, particularly as compared to a composition that does not include the dynamically crosslinked impact modifier. Accordingly, the thermoplastic composition can exhibit excellent strength characteristics at a wide range of temperatures.

The thermoplastic composition can exhibit very good tensile characteristics. For example, the thermoplastic composition can have a tensile elongation at yield of greater than about 4.5%, greater than about 6%, greater than about 7%, greater than about 10%, greater than about 25%, greater than about 35%, greater than about 50%, greater than about 70%, greater than about 75%, greater than about 80%, or greater than about 90%. Similarly, the tensile elongation at break can be quite high, for instance greater than about 10%, greater than about 25%, greater than about 35%, greater than about 50%, greater than about 70%, greater than about 75%, greater than about 80%, or greater than about 90%. The strain at break can be greater than about 5%, greater than about 15%, greater than about 20%, or greater than about 25%. For instance the strain at break can be about 90%. The yield strain can likewise be high, for instance greater than about 5%, greater than about 15%, greater than about 20%, or greater than about 25%. The yield stress can be, for example, greater than about 50% or greater than about 53%. The thermoplastic composition may have a tensile strength at break of greater than about 30 MPa, greater than about 35 MPa, greater than about 40 MPa, greater than about 45 MPa, or greater than about 70 MPa.

In addition, the thermoplastic composition can have a relatively low tensile modulus. For instance, the thermoplastic composition can have a tensile modulus less than about 3000 MPa, less than about 2300 MPa, less than about 2000 MPa, less than about 1500 MPa, or less than about 1100 MPa as determined according to ISO Test No. 527 at a temperature of 23° C. and a test speed of 5 mm/min.

The thermoplastic composition can exhibit good characteristics after annealing as well. For instance, following annealing at a temperature of about 230° C. for a period of time of about 2 hours, the tensile modulus of the composition can be less than about 2500 MPa, less than about 2300 MPa, or less than about 2250 MPa. The tensile strength at break after annealing can be greater than about 50 MPa, or greater than about 55 MPa, as measured according to ISO Test No. 527 at a temperature of 23° C. and a test speed of 5 mm/min.

The thermoplastic composition can also be utilized continuously at high temperature, for instance at a continuous use temperature of up to about 150° C., about 160° C., or about 165° C. without loss of tensile strength. For example, the thermoplastic composition can maintain greater than about 95%, for instance about 100% of the original tensile strength after 1000 hours of heat aging at 165° C. and can maintain greater than about 95%, for instance about 100% of the original tensile elongation at yield after 1000 hours heat aging at 135° C.

Tensile characteristics can be determined according to ISO Test No. 527 at a temperature of 23° C. and a test speed of 5 mm/min or 50 mm/min (technically equivalent to ASTM D623 at 23° C.).

The flexural characteristics of the composition can be determined according to ISO Test No. 178 (technically equivalent to ASTM D790 at a temperature of 23° C. and a testing speed of 2 mm/min. For example, the flexural modulus of the composition can be less than about 2500 MPa, less than about 2300 MPa, less than about 2000 MPa, less than about 1800 MPa, or less than about 1500 MPa. The thermoplastic composition may have a flexural strength at break of greater than about 30 MPa, greater than about 35 MPa, greater than about 40 MPa, greater than about 45 MPa, or greater than about 70 MPa.

The deflection temperature under load of the thermoplastic composition can be relatively high. For example, the deflection temperature under load of the thermoplastic composition can be greater than about 80° C., greater than about 90° C., greater than about 100° C., or greater than about 105° C., as determined according to ISO Test No. 75-2 (technically equivalent to ASTM D790) at 1.8 MPa.

The Vicat softening point can be greater than about 200° C. or greater than about 250° C., for instance about 270° C. as determined according to the Vicat A test when a load of 10 N is used at a heating rate of 50 K/hr. For the Vicat B test, when a load of 50 N is used at a heating rate of 50 K/hr, the Vicat softening point can be greater than about 100° C., greater than about 150° C. greater than about 175° C., or greater than about 190° C., for instance about 200° C. The Vicat softening point can be determined according to ISO Test No. 306 (technically equivalent to ASTM D1525).

The thermoplastic composition can also exhibit excellent stability during long term exposure to harsh environmental conditions. For instance, under long term exposure to an acidic environment, the thermoplastic composition can exhibit little loss in strength characteristics. For instance, following 500 hours exposure to a strong acid (e.g., a solution of about 5% or more strong acid such as sulfuric acid, hydrochloric acid, nitric acid, perchloric acid, etc.), the thermoplastic composition can exhibit a loss in Charpy notched impact strength of less than about 17%, or less than about 16% following exposure of about 500 hours to a strong acid solution at a temperature of about 40° C., and can exhibit a loss in Charpy notched impact strength of less than about 25%, or less than about 22% following exposure of about 500 hours to a strong acid solution at a temperature of about 80° C. Even under harsher conditions, for instance in a 10% sulfuric acid solution held at a temperature of about 80° C. for 1000 hours, the thermoplastic composition can maintain about 80% or more of the initial Charpy notched impact strength. The thermoplastic composition can also maintain desirable strength characteristics following exposure to other potentially degrading materials, such as salts, e.g., road salts as may be encountered by fuel lines.

Permeation resistance can be important for fuel lines. The thermoplastic composition can exhibit excellent permeation resistance to a wide variety of fuels. For instance, a fuel line formed of the thermoplastic composition can exhibit a permeation resistance to a fuel (e.g., gasoline, diesel fuel, jet fuel, blended fuels, etc.) of less than about 3 g-mm/m$^2$-day, less than about 2 g-mm/m$^2$-day, less than about 1 g-mm/m$^2$-day, or less than about 0.5 g-mm/m$^2$-day. By way of example, the thermoplastic composition (or a fuel line formed of the thermoplastic composition) can exhibit a permeation resistance to an ethanol blend of ethanol/isooctane/toluene at a weight ratio of 10:45:45 at 40° C. of less than about 3 g-mm/m$^2$-day, less than about 2.5 g-mm/m$^2$-day, less than about 1 g-mm/m$^2$-day, or less than about 0.1 g-mm/m$^2$-day. The permeation resistance to a blend of 15 wt. % methanol and 85 wt. % oxygenated fuel (CM15A) at 40° C. can be less than about 3 g-mm/m$^2$-day, less than about 2.5 g-mm/m$^2$-day, less than about 1 g-mm/m$^2$-day, less than about 0.5 g-mm/m$^2$-day, less than about 0.3 g-mm/m$^2$-day, or less than about 0.15 g-mm/m$^2$-day. The permeation resistance to methanol at 40° C. can be less than about 1 g-mm/m$^2$-day, less than about 0.5 g-mm/m$^2$-day, less than about 0.25 g-mm/m$^2$-day, less than about 0.1 g-mm/m$^2$-day, or less than about 0.06 g-mm/m$^2$-day. Permeation resistance can be determined according to SAE Testing Method No. J2665. In addition, the thermoplastic composition can maintain the original density following long term exposure to hydrocarbons. For example, the composition can maintain greater than about 95% of original density, greater than about 96% of original density, such as about 99% of original density following long term (e.g., greater than about 14 days) exposure to hydrocarbons such as heptane, cyclohexane, toluene, and so forth, or combinations of hydrocarbons.

The thermoplastic composition can exhibit good heat resistance and flame retardant characteristics. For instance, the composition can meet the V-0 flammability standard at a thickness of 0.2 millimeters. The flame retarding efficacy may be determined according to the UL 94 Vertical Burn Test procedure of the "Test for Flammability of Plastic Materials for Parts in Devices and Appliances", 5th Edition, Oct. 29, 1996. The ratings according to the UL 94 test are listed in the following table:

| Rating | Afterflame Time (s) | Burning Drips | Burn to Clamp |
| --- | --- | --- | --- |
| V-0 | <10 | No | No |
| V-1 | <30 | No | No |
| V-2 | <30 | Yes | No |
| Fail | <30 | | Yes |
| Fail | >30 | | No |

The "afterflame time" is an average value determined by dividing the total afterflame time (an aggregate value of all samples tested) by the number of samples. The total afterflame time is the sum of the time (in seconds) that all the samples remained ignited after two separate applications of a flame as described in the UL-94 VTM test. Shorter time periods indicate better flame resistance, i.e., the flame went out faster. For a V-0 rating, the total afterflame time for five (5) samples, each having two applications of flame, must not exceed 50 seconds. Using the flame retardant of the present invention, articles may achieve at least a V-1 rating, and typically a V-0 rating, for specimens having a thickness of 0.2 millimeters.

The thermoplastic composition can also exhibit good processing characteristics, for instance as demonstrated by the melt viscosity of the composition. For instance, the thermoplastic composition can have a melt viscosity of less than about 2800 poise as measured on a capillary rheometer at 316° C. and 400 sec$^{-1}$ with the viscosity measurement taken after five minutes of constant shear. Moreover, the thermoplastic composition can exhibit improved melt stability over time as compared to thermoplastic compositions that include polyarylene sulfide and do not include cross-linked impact modifiers. While thermoplastic compositions that include polyarylene sulfide and do not include a cross-linked impact modifier tend to exhibit an increase in melt viscosity over time, disclosed compositions can maintain or even decrease in melt viscosity over time.

The thermoplastic composition can have a complex viscosity as determined at low shear (0.1 radians per second (rad/s)) and 310° C. of greater than about 10 kPa/sec, greater than about 25 kPa/sec, greater than about 40 kPa/sec, greater than about 50 kPa/sec, greater than about 75 kPa/sec, greater than about 200 kPa/sec, greater than about 250 kPa/sec, greater than about 300 kPa/sec, greater than about 350 kPa/sec, greater than about 400 kPa/sec, or greater than about 450 kPa/sec. Higher value for complex viscosity at low shear is indicative of the crosslinked structure of the composition and the higher melt strength of the thermoplastic composition. In addition, the thermoplastic composition can exhibit high shear sensitivity, which indicates excellent characteristics for use in formation processes such as blow molding and extrusion processing.

The thermoplastic composition can be processed according to standard formation techniques to form a fuel line that can be either a single layer fuel tube or a multi-layer fuel hose. Fuel lines as encompassed herein are tubular shaped members having a hollow passage therethrough that allows passage of a fluid, a liquid, a gas, or a mixture thereof, through the fuel line. A fuel line can include the thermoplastic composition throughout the entire fuel line or only a portion of the fuel line. For instance, when considering a fuel line having a large aspect ratio (L/D>1), the fuel line can be formed such that the thermoplastic composition extends along a section of the fuel line and an adjacent section can be formed of a different composition, for instance a different thermoplastic composition. Such a fuel line can be formed by, e.g., altering the material that is fed to a molding device during a formation process. The fuel line can include an area in which the two materials are mixed that represents a border region between a first section and a second section formed of different materials. A fuel line can include a single section formed of the thermoplastic composition or a plurality of sections, as desired. Moreover, other sections of a fuel line can be formed of multiple different materials. By way of example, both ends of the fuel line can be formed of the thermoplastic composition and a center section can be formed of a less flexible composition. Thus, the more flexible ends can be utilized to tightly affix the fuel line to other components of a system. Alternatively, a center section of a fuel line could be formed from the thermoplastic composition, which can improve flexibility of the fuel line in that section, making installation of the fuel line easier.

FIG. 1 illustrates a portion of the fuel system that can include a fuel line that includes the thermoplastic composition. FIG. 1 illustrates the intake portion generally 1 of a fuel system and includes a fuel filler neck 2, a filler tube 24, a fuel tank 28, a vent tube 26, and a gas cap 14, and is supported by an automobile body 16, which includes a movable cover 20 to conceal the gas cap 14. The filler neck 2 generally includes a funnel-shaped member 8. The filler neck 2 may receive a nozzle receptor 12, which is an insert adapted to receive a fuel nozzle 6 during fueling. The member 8 is defined at one end by an inlet opening 10 adapted to receive the gas cap 14, which screws directly into threads 36 integrally formed in the member 8.

An opposite end of the member 8 is defined by an outlet opening 22, which is coupled to a first end 34 of a fuel line 24. The fuel line 24 can be a single layer tube or a multi-layer hose formed of the thermoplastic composition. At a second end 32, the fuel line 24 is coupled to the fuel tank 28. The fuel tank system 4 may also include a vent line 26 that connects to the member 8 at funnel vent opening 30 and to the fuel tank 28 at fuel tank opening 40. The vent line 26 allows displaced vapors in the fuel tank 28 to be vented during fueling. The vent line 26 may also be a single layer tube or a multi-layer hose that can be formed from the thermoplastic composition.

Any fuel line that has a generally tubular shape and includes a hollow passage through the line (i.e., in the axial direction of the tubular member) as may be included in a vehicle engine, including both gasoline and diesel engines, may include one or more layers formed of the thermoplastic composition, and it should be understood that the fuel lines are not in any way limited to the in-take portion of the fuel system as illustrated in FIG. 1. For example, fuel lines encompassed herein include fuel feed lines that carry fuel from the fuel tank to the engine and can be located downstream and/or upstream of the fuel filter. Other fuel lines as may incorporate the thermoplastic composition can include, without limitation, fuel return lines, fuel bypass lines, fuel crossover lines, breather lines, evaporation lines, etc.

FIG. 2 illustrates a perspective view of a single layer tube 50 formed of the thermoplastic composition. A single layer tube can be utilized, for example, in forming a vent line 26 and/or a fuel line 24 as illustrated in FIG. 1. A single layer tube 50 can generally have a wall thickness of less than about 3 millimeters, for instance from about 0.5 to about 2.5 millimeters, or from about 0.8 to about 2 millimeters. Single layer tube 50 can generally have a cross sectional diameter of less than about 10 millimeters, or less than about 5 millimeters in one embodiment. The length of a single layer tube can vary depending on the specific application and can be relatively long, for instance about 1 meter long or more, or can be short, for instance less than about 50 centimeters, or less than about 10 centimeters. Additionally, a single layer tube 50 can have a corrugated surface or a smooth surface.

A fuel line that incorporates the thermoplastic composition can be a multi-layered tubular member. FIG. 3 illustrates a two-layered fuel line 60 and FIG. 4 illustrates a three-layered fuel line 70 as may incorporate the thermoplastic composition in one or more layers of the fuel line 60, 70. Multi-layer fuel lines are not limited to two or three layers, however, and additional layers may be included in a fuel line, as desired. Multi-layer fuel lines, similar to single layer fuel tubes, can be formed to have a wide variety of cross sectional and length dimensions, as is known in the art. In general, each layer of a multi-layer fuel line can have a wall thickness of less than about 2 millimeters, or less than about 1 millimeter; and the inner diameter of the multi-layer fuel line can generally be less than about 100 millimeters, less than about 50 millimeters, or less than about 30 millimeters.

As can be seen, two-layered fuel line 60 includes an inner layer 61 and an outer layer 62. Three-layered fuel line 70 includes an inner layer 71, an intermediate layer 72, and an outer layer 73. The excellent barrier properties of the thermoplastic composition combined with the chemical resistance properties of the thermoplastic composition make it suitable for use in forming an inner layer of a multi-layer fuel line. For example, the inner layers 61, 71 of the illustrated fuel lines 60, 70 can be formed of the thermoplastic composition.

The thermoplastic composition is not limited to utilization as an inner layer of a multi-layer fuel line. The high strength characteristics of the thermoplastic composition combined with the excellent barrier properties and good flexibility make the thermoplastic composition suitable for use in forming outer layers and/or intermediate layers of a multi-layer fuel line in addition to or alternative to forming the inner layer of the multi-layer fuel line.

In those embodiments in which the thermoplastic composition forms a layer of the multi-layer hose, additional layers can be formed of a material that is the same or different than the thermoplastic composition that forms the layer of the thermoplastic composition. For example, when considering a fuel line that includes three or more layers, an intermediate layer 72 can be formed of a material that exhibits high resistance to pressure and mechanical effects. By way of example, layer 72 can be formed of polyamides from the group of homopolyamides, co-polyamides, their blends or mixtures which each other or with other polymers. Alternatively, layer 72 can be formed of a fiber reinforced material such as a fiber-reinforced resin composite or the like. For example, a polyaramid (e.g., Kevlar®) woven mat can be utilized to form an intermediate layer 72 that is highly resistant to mechanical assaults. Such materials may also be utilized to form an inner layer of a fuel hose in those embodiments in which the thermoplastic composition is utilized for one or more layers other than the inner layer of the fuel hose. An intermediate layer may be formed over the pre-formed inner layer or may be formed first, and the inner layer may be formed on the interior surface of the first-formed layer, for instance according to a blow molding method.

Outer layer 62, 73 of a multi-layer fuel hose 60, 70 can provide protection from external assaults. For example, a multi-layer fuel hose can include an outer layer 62, 73 formed from the thermoplastic composition or from an adequate kind of rubber material having high levels of chipping, weather, flame and cold resistance. Examples of such materials include thermoplastic elastomer such as polyamide thermoplastic elastomer, polyester thermoplastic elastomer, polyolefin thermoplastic elastomer, and styrene thermoplastic elastomer. Suitable materials for outer layers 62, 73 include, without limitation, ethylene-propylene-diene terpolymer rubber, ethylene-propylene rubber, chlorosulfonated polyethylene rubber, a blend of acrylonitrile-butadiene rubber and polyvinyl chloride, a blend of acrylonitrile-butadiene rubber and ethylene-propylene-diene terpolymer rubber, and chlorinated polyethylene rubber.

Outer layer 62, 73 can alternatively be formed of a harder, less flexible material, such as a polyolefin, polyvinylchloride, or a high density polyethylene, a fiber reinforced composite material such as a glass fiber composite or a carbon fiber composite.

A multi-layer fuel line may further contain one or more adhesive layers formed from adhesive materials such as, for example, polyester polyurethanes, polyether polyurethanes, polyester elastomers, polyether elastomers, polyamides, polyether polyamides, polyether polyimides, functionalized polyolefins, and the like.

FIG. 5 schematically illustrates a process that can be used in forming the thermoplastic composition used in forming a fuel line. As illustrated, the components of the thermoplastic composition may be melt-kneaded in a melt processing unit such as an extruder 300. Extruder 300 can be any extruder as is known in the art including, without limitation, a single, twin, or multi-screw extruder, a co-rotating or counter rotating extruder, an intermeshing or non-intermeshing extruder, and so forth. In one embodiment, the composition may be melt processed in an extruder 300 that includes multiple zones or barrels. In the illustrated embodiment, extruder 300 includes 10 barrels numbered 321-330 along the length of the extruder 300, as shown. Each barrel 321-330 can include one or more feed lines 314, 316, vents 312, temperature controls, etc. that can be independently operated. A general purpose screw design can be used to melt process the thermoplastic composition. By way of example, a thermoplastic composition may be melt mixed using a twin screw extruder such as a Coperion co-rotating fully intermeshing twin screw extruder.

In forming a thermoplastic composition, a polyarylene sulfide can be fed to the extruder 300 at a main feed throat 314. For instance, the polyarylene sulfide may be fed to the main feed throat 314 at the first barrel 321 by means of a metering feeder. The polyarylene sulfide can be melted and mixed with the other components of the composition as it progresses through the extruder 300. The impact modifier can be added to the composition in conjunction with the thermoplastic composition at the main feed throat 314 or downstream of the main feed throat, as desired.

At a point downstream of the main feed throat 314, and following addition of the impact modifier to the composition, the crosslinking agent can be added to the composition. For instance, in the illustrated embodiment, a second feed line 316 at barrel 326 can be utilized for addition of the crosslinking agent. The point of addition for the crosslinking agent is not particularly limited. However, the crosslinking agent can be added to the composition at a point after the polyarylene sulfide has been mixed with the impact modifier under shear such that the impact modifier is well distributed throughout the polyarylene sulfide.

The polyarylene sulfide may be a polyarylene thioether containing repeat units of the formula (I):

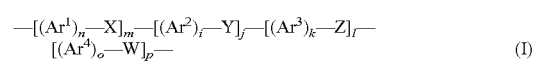

(I)

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes more than about 30 mol %, more than about 50 mol %, or more than about 70 mol % arylene sulfide (—S—) units. In one embodiment the polyarylene sulfide includes at least 85 mol % sulfide linkages attached directly to two aromatic rings.

In one embodiment, the polyarylene sulfide is a polyphenylene sulfide, defined herein as containing the phenylene sulfide structure —$(C_6H_4$—$S)_n$— (wherein n is an integer of 1 or more) as a component thereof.

The polyarylene sulfide may be synthesized prior to forming the thermoplastic composition, though this is not a requirement of a process. For example, a polyarylene sulfide can be purchased from known suppliers. For instance Fortron® polyphenylene sulfide available from Ticona of Florence, Ky., USA can be purchased and utilized as the polyarylene sulfide. When the polyarylene sulfide is synthesized, synthesis techniques as are generally known in the art may be utilized. By way of example, a process for producing a polyarylene sulfide can include reacting a material that provides a hydrosulfide ion, e.g., an alkali metal sulfide, with a dihaloaromatic compound in an organic amide solvent.

The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom can be fluorine, chlorine, bromine or iodine, and 2 halogen atoms in the same dihalo-aromatic compound may be the same or different from each other. In one embodiment, o-dichlorobenzene, m-dichlorobenzene, p-dichlorobenzene or a mixture of 2 or more compounds thereof is used as the dihalo-aromatic compound.

As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide may be a homopolymer or may be a copolymer. By a suitable, selective combination of dihaloaromatic compounds, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

and segments having the structure of formula (III):

or segments having the structure of formula (IV):

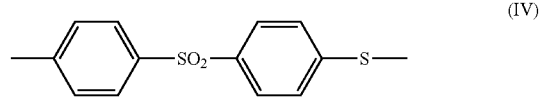

In general, the amount of the dihaloaromatic compound(s) per mole of the effective amount of the charged alkali metal sulfide can generally be from 1.0 to 2.0 moles, from 1.05 to 2.0 moles, or from 1.1 to 1.7 moles. Thus, the polyarylene sulfide can include alkyl halide (generally alkyl chloride) end groups.

A process for producing the polyarylene sulfide can include carrying out the polymerization reaction in an organic amide solvent. Exemplary organic amide solvents used in a polymerization reaction can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The amount of the organic amide solvent used in the reaction can be, e.g., from 0.2 to 5 kilograms per mole (kg/mol) of the effective amount of the alkali metal sulfide.

The polymerization can be carried out by a step-wise polymerization process. The first polymerization step can include introducing the dihaloaromatic compound to a reactor, and subjecting the dihaloaromatic compound to a polymerization reaction in the presence of water at a temperature of from about 180° C. to about 235° C., or from about 200° C. to about 230° C., and continuing polymerization until the conversion rate of the dihaloaromatic compound attains to not less than about 50 mol % of the theoretically necessary amount.

In a second polymerization step, water is added to the reaction slurry so that the total amount of water in the polymerization system is increased to about 7 moles, or to about 5 moles, per mole of the effective amount of the charged alkali metal sulfide. Following, the reaction mixture of the polymerization system can be heated to a temperature of from about 250° C. to about 290° C., from about 255° C. to about 280° C., or from about 260° C. to about 270° C. and the polymerization can continue until the melt viscosity of the thus formed polymer is raised to the desired final level of the polyarylene sulfide. The duration of the second polymerization step can be, e.g., from about 0.5 to about 20 hours, or from about 1 to about 10 hours.

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be utilized that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups. Methods that may be used in making semi-linear polyarylene sulfide are generally known in the art. By way of example, monomer components used in forming a semi-linear polyarylene sulfide can include an amount of polyhaloaromatic compounds having 2 or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Following polymerization, the polyarylene sulfide may be washed with liquid media. For instance, the polyarylene sulfide may be washed with water and/or organic solvents that will not decompose the polyarylene sulfide including, without limitation, acetone, N-methyl-2-pyrrolidone, a salt solution, and/or an acidic media such as acetic acid or hydrochloric acid prior to combination with other components while forming the mixture. The polyarylene sulfide can be washed in a sequential manner that is generally known to persons skilled in the art. Washing with an acidic solution or a salt solution may reduce the sodium, lithium or calcium metal ion end group concentration from about 2000 ppm to about 100 ppm.

A polyarylene sulfide can be subjected to a hot water washing process. The temperature of a hot water wash can be at or above about 100° C., for instance higher than about 120° C., higher than about 150° C., or higher than about 170° C.

The polymerization reaction apparatus for forming the polyarylene sulfide is not especially limited, although it is typically desired to employ an apparatus that is commonly used in formation of high viscosity fluids. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. Further examples of such a reaction apparatus include a mixing apparatus commonly used in kneading, such as a kneader, a roll mill, a Banbury mixer, etc. Following polymerization, the molten polyarylene sulfide may be discharged from the reactor, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

The thermoplastic composition may include the polyarylene sulfide component (which also encompasses a blend of polyarylene sulfides) in an amount from about 10 wt. % to about 99 wt. % by weight of the composition, for instance from about 20% wt. % to about 90 wt. % by weight of the composition.

The polyarylene sulfide may be of any suitable molecular weight and melt viscosity, generally depending upon the final application intended for the thermoplastic composition. For instance, the melt viscosity of the polyarylene sulfide may be a low viscosity polyarylene sulfide, having a melt viscosity of less than about 500 poise, a medium viscosity polyarylene sulfide, having a melt viscosity of between about 500 poise and about 1500 poise, or a high melt viscosity polyarylene sulfide, having a melt viscosity of greater than about 1,500 poise, as determined in accordance with ISO Test No. 11443 at a shear rate of $1200\ s^{-1}$ and at a temperature of 310° C.

According to one embodiment, the polyarylene sulfide can be functionalized to further encourage bond formation between the polyarylene sulfide and the impact modifier, which can further improve distribution of the impact modifier throughout the composition and further prevent phase separation. For instance, a polyarylene sulfide can be further treated following formation with a carboxyl, acid anhydride, amine, isocyanate or other functional group-containing modifying compound to provide a functional terminal group on the polyarylene sulfide. By way of example, a polyarylene sulfide can be reacted with a modifying compound containing a mercapto group or a disulfide group and also containing a reactive functional group. In one embodiment, the polyarylene sulfide can be reacted with the modifying compound in an organic solvent. In another embodiment, the polyarylene sulfide can be reacted with the modifying compound in the molten state.

In one embodiment, a disulfide compound containing the desired functional group can be incorporated into the thermoplastic composition formation process, and the polyarylene sulfide can be functionalized in conjunction with formation of the composition. For instance, a disulfide compound containing the desired reactive functional groups can be added to the melt extruder in conjunction with the polyarylene sulfide or at any other point prior to or in conjunction with the addition of the crosslinking agent.

Reaction between the polyarylene sulfide polymer and the reactively functionalized disulfide compound can include chain scission of the polyarylene sulfide polymer that can decrease melt viscosity of the polyarylene sulfide. In one embodiment, a higher melt viscosity polyarylene sulfide having low halogen content can be utilized as a starting polymer. Following reactive functionalization of the polyarylene sulfide polymer by use of a functional disulfide compound, a relatively low melt viscosity polyarylene sulfide with low halogen content can be formed. Following this chain scission, the melt viscosity of the polyarylene sulfide can be suitable for further processing, and the overall halogen content of the low melt viscosity polyarylene sulfide can be quite low. A thermoplastic composition that exhibits excellent strength and degradation resistance in addition to low halogen content can be advantageous as low halogen content polymeric materials are becoming increasingly desired due to environmental concerns. In one embodiment, the thermoplastic composition can have a halogen content of less than about 1000 ppm, less than about 900 ppm, less than about 600 ppm, or less than about 400 ppm as determined according to an elemental analysis using Parr Bomb combustion followed by Ion Chromatography.

The disulfide compound can generally have the structure of:

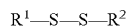

$$R^1\text{—}S\text{—}S\text{—}R^2$$

wherein $R^1$ and $R^2$ may be the same or different and are hydrocarbon groups that independently include from 1 to about 20 carbons. For instance, $R^1$ and $R^2$ may be an alkyl, cycloalkyl, aryl, or heterocyclic group. $R^1$ and $R^1$ may include reactive functionality at terminal end(s) of the disulfide compound. For example, at least one of $R^1$ and $R^2$ may include a terminal carboxyl group, hydroxyl group, a substituted or non-substituted amino group, a nitro group, or the like. In general, the reactive functionality can be selected such that the reactively functionalized polyarylene sulfide can react with the impact modifier. For example, when considering an epoxy-terminated impact modifier, the disulfide compound can include carboxyl and/or amine functionality.

Examples of disulfide compounds including reactive terminal groups as may be encompassed herein may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole) and 2-(4'-morpholinodithio)benzothiazole.

The ratio of the amount of the polyarylene sulfide to the amount of the disulfide compound can be from about 1000:1 to about 10:1, from about 500:1 to about 20:1, or from about 400:1 to about 30:1.

In addition to the polyarylene sulfide polymer, the composition also includes an impact modifier. More specifically, the impact modifier can be an olefinic copolymer or terpolymer. For instance, the impact modifier can include ethylenically unsaturated monomer units have from about 4 to about 10 carbon atoms.

The impact modifier can be modified to include functionalization so as to react with the crosslinking agent. For instance, the impact modifier can be modified with a mole fraction of from about 0.01 to about 0.5 of one or more of the following: an α, β unsaturated dicarboxylic acid or salt thereof having from about 3 to about 8 carbon atoms; an α, β unsaturated carboxylic acid or salt thereof having from about 3 to about 8 carbon atoms; an anhydride or salt thereof having from about 3 to about 8 carbon atoms; a monoester or salt thereof having from about 3 to about 8 carbon atoms; a sulfonic acid or a salt thereof; an unsaturated epoxy compound having from about 4 to about 11 carbon atoms. Examples of such modification functionalities include maleic anhydride, fumaric acid, maleic acid, methacrylic acid, acrylic acid, and glycidyl methacrylate. Examples of metallic acid salts include the alkaline metal and transitional metal salts such as sodium, zinc, and aluminum salts.

A non-limiting listing of impact modifiers that may be used include ethylene-acrylic acid copolymer, ethylene-maleic anhydride copolymers, ethylene-alkyl (meth)acrylate-maleic anhydride terpolymers, ethylene-alkyl (meth)acrylate-glycidyl (meth)acrylate terpolymers, ethylene-acrylic ester-methacrylic acid terpolymer, ethylene-acrylic ester-maleic anhydride terpolymer, ethylene-methacrylic acid-methacrylic acid alkaline metal salt (ionomer) terpolymers, and the like. In one embodiment, for instance, an impact modifier can include a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

According to one embodiment, the impact modifier may be a linear or branched, homopolymer or copolymer (e.g., random, graft, block, etc.) containing epoxy functionalization, e.g., terminal epoxy groups, skeletal oxirane units, and/or pendent epoxy groups. For instance, the impact modifier may be a copolymer including at least one monomer component that includes epoxy functionalization. The monomer units of the impact modifier may vary. In one embodiment, for example, the impact modifier can include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers as may be incorporated in the impact modifier may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Other monomer units may additionally or alternatively be a component of the impact modifier. Examples of other monomers may include, for example, ester monomers, olefin monomers, amide monomers, etc. In one embodiment, the impact modifier can include at least one linear or branched α-olefin monomer, such as those having from 2 to 20 carbon atoms, or from 2 to 8 carbon atoms. Specific examples include ethylene; propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene.

Monomers included in an impact modifier that includes epoxy functionalization can include monomers that do not include epoxy functionalization, as long as at least a portion of the monomer units of the polymer are epoxy functionalized.

In one embodiment, the impact modifier can be a terpolymer that includes epoxy functionalization. For instance, the impact modifier can include a methacrylic component that includes epoxy functionalization, an α-olefin component, and a methacrylic component that does not include epoxy functionalization. For example, the impact modifier may be poly(ethylene-co-methylacrylate-co-glycidyl methacrylate), which has the following structure:

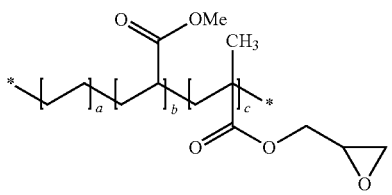

wherein, a, b, and c are 1 or greater.

In another embodiment the impact modifier can be a random copolymer of ethylene, ethyl acrylate and maleic anhydride having the following structure:

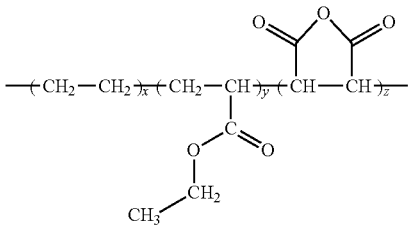

wherein x, y and z are 1 or greater.

The relative proportion of the various monomer components of a copolymeric impact modifier is not particularly limited. For instance, in one embodiment, the epoxy-functional methacrylic monomer components can form from about 1 wt. % to about 25 wt. %, or from about 2 wt. % to about 20 wt % of a copolymeric impact modifier. An a-olefin monomer can form from about 55 wt. % to about 95 wt. %, or from about 60 wt. % to about 90 wt. %, of a copolymeric impact modifier. When employed, other monomeric components (e.g., a non-epoxy functional methacrylic monomers) may constitute from about 5 wt. % to about 35 wt. %, or from about 8 wt. % to about 30 wt. %, of a copolymeric impact modifier.

An impact modifier may be formed according to standard polymerization methods as are generally known in the art. For example, a monomer containing polar functional groups may be grafted onto a polymer backbone to form a graft copolymer. Alternatively, a monomer containing functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

Alternatively, an impact modifier may be obtained on the retail market. By way of example, suitable compounds for use as an impact modifier may be obtained from Arkema under the name Lotader®.

The molecular weight of the impact modifier can vary widely. For example, the impact modifier can have a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7.

In general, the impact modifier may be present in the composition in an amount from about 0.05% to about 40% by weight, from about 0.05% to about 37% by weight, or from about 0.1% to about 35% by weight.

Referring again to FIG. 5, the impact modifier can be added to the composition in conjunction with the polyarylene sulfide at the main feed throat 314 of the melt processing unit. This is not a requirement of the composition formation process, however, and in other embodiments, the impact modifier can be added downstream of the main feed throat. For instance, the impact modifier may be added at a location downstream from the point at which the polyarylene sulfide is supplied to the melt processing unit, but yet prior to the melting section, i.e., that length of the melt processing unit in which the polyarylene sulfide becomes molten. In another embodiment, the impact modifier may be added at a location downstream from the point at which the polyarylene sulfide becomes molten.

If desired, one or more distributive and/or dispersive mixing elements may be employed within the mixing section of the melt processing unit. Suitable distributive mixers for single screw extruders may include but are not limited to, for instance, Saxon, Dulmage, Cavity Transfer mixers, etc. Likewise, suitable dispersive mixers may include but are not limited to Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

In addition to the polyarylene sulfide and the impact modifier, the thermoplastic composition can include a crosslinking agent. The crosslinking agent can be a polyfunctional compound or combination thereof that can react with functionality of the impact modifier to form crosslinks within and among the polymer chains of the impact modifier. In general, the crosslinking agent can be a non-polymeric compound, i.e., a molecular compound that includes two or more reactively functional terminal moieties linked by a bond or a non-polymeric (non-repeating) linking component. By way of example, the crosslinking agent can include but is not limited to di-epoxides, poly-functional epoxides, diisocyanates, polyisocyanates, polyhydric alcohols, water-soluble carbodiimides, diamines, diaminoalkanes, polyfunctional carboxylic acids, diacid halides, and so forth. For instance, when considering an epoxy-functional impact modifier, a non-polymeric polyfunctional carboxylic acid or amine can be utilized as a crosslinking agent.

Specific examples of polyfunctional carboxylic acid crosslinking agents can include, without limitation, isophthalic acid, terephthalic acid, phthalic acid, 1,2-di(p-carboxyphenyl)ethane, 4,4'-dicarboxydiphenyl ether, 4,4'-bisbenzoic acid, 1,4- or 1,5-naphthalene dicarboxylic acids, decahydronaphthalene dicarboxylic acids, norbornene dicarboxylic acids, bicyclooctane dicarboxylic acids, 1,4-cyclohexanedicarboxylic acid (both cis and trans), 1,4-hexylenedicarboxylic acid, adipic acid, azelaic acid, dicarboxyl dodecanoic acid, succinic acid, maleic acid, glutaric acid, suberic acid, azelaic acid and sebacic acid. The corresponding dicarboxylic acid derivatives, such as carboxylic acid diesters having from 1 to 4 carbon atoms in the alcohol radical, carboxylic acid anhydrides or carboxylic acid halides may also be utilized.

Exemplary diols useful as crosslinking agents can include, without limitation, aliphatic diols such as ethylene glycol, 1,2-propylene glycol, 1,3-propylene glycol, 2,2-dimethyl-1,3-propane diol, 2-ethyl-2-methyl-1,3-propane diol, 1,4-butane diol, 1,4-but-2-ene diol, 1,3-1,5-pentane diol, 1,5-pentane diol, dipropylene glycol, 2-methyl-1,5-pentane diol, and the like. Aromatic diols can also be utilized such as, without limitation, hydroquinone, catechol, resorcinol, methylhydroquinone, chlorohydroquinone, bisphenol A, tetrachlorobisphenol A, phenolphthalein, and the like. Exemplary cycloaliphatic diols as may be used include a cycloaliphatic moiety, for example 1,6-hexane diol, dimethanol decalin, dimethanol bicyclooctane, 1,4-cyclohexane dimethanol (including its cis- and trans-isomers), triethylene glycol, 1,10-decanediol, and the like.

Exemplary diamines that may be utilized as crosslinking agents can include, without limitation, isophorone-diamine, ethylenediamine, 1,2-, 1,3-propylene-diamine, N-methyl-1,3-propylene-diamine, N,N'-dimethyl-ethylenediamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes. (cyclo)aliphatic diamines, such as, for example, isophorone-diamine, ethylenediamine, 1,2-, 1,3-propylene-diamine, N-methyl-1,3-propylene-diamine, N,N'-dimethyl-ethylenediamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes.

In one embodiment, the composition can include a disulfide-free crosslinking agent. For example, the crosslinking agent can include carboxyl and/or amine functionality with no disulfide group that may react with the polyarylene sulfide. A crosslinking agent that is disulfide-free can be utilized so as to avoid excessive chain scission of the polyarylene sulfide by the crosslinking agent during formation of the composition. It should be understood, however, that the utilization of a disulfide-free crosslinking agent does not in any way limit the utilization of a reactively functionalized disulfide compound for functionalizing the polyarylene sulfide. For instance, in one embodiment, the composition can be formed according to a process that includes addition of a reactively functionalized disulfide compound to the melt processing unit that can reactively functionalize the polyarylene sulfide. The crosslinking agent utilized in this embodiment can then be a disulfide-free crosslinking agent that can include functionality that is reactive with the impact modifier as well as with the reactively functionalized polyarylene sulfide. Thus, the composition can be highly crosslinked without excessive scission of the polyarylene sulfide polymer chains.

In another embodiment the crosslinking agent and the polyarylene sulfide functionalization compound (when present) can be selected so as to encourage chain scission of the polyarylene sulfide. This may be beneficial, for instance, which chain scission is desired to decrease the melt viscosity of the polyarylene sulfide polymer.

The thermoplastic composition may generally include the crosslinking agent in an amount from about 0.05 wt. % to about 2 wt. % by weight of the thermoplastic composition, from about 0.07 wt. % to about 1.5 wt. % by weight of the thermoplastic composition, or from about 0.1 wt. % to about 1.3 wt. %.

The crosslinking agent can be added to the melt processing unit following mixing of the polyarylene sulfide and the impact modifier. For instance, as illustrated in FIG. 5, the crosslinking agent can be added to the composition at a downstream location 316 following addition of polyarylene sulfide and the impact modifier (either together or separately) to the melt processing unit. This can ensure that the impact modifier has become dispersed throughout the polyarylene sulfide prior to addition of the crosslinking agent.

To help encourage distribution of the impact modifier throughout the melt prior to addition of the crosslinking agent, a variety of different parameters may be selectively controlled. For example, the ratio of the length ("L") to diameter ("D") of a screw of the melt processing unit may be selected to achieve an optimum balance between throughput and impact modifier distribution. For example, the L/D value after the point at which the impact modifier is supplied may be controlled to encourage distribution of the impact modifier. More particularly, the screw has a blending length ("$L_B$") that is defined from the point at which both the impact modifier and the polyarylene sulfide are supplied to the unit (i.e., either where they are both supplied in conjunction with one another or the point at which the latter of the two is supplied) to the point at which the crosslinking agent is supplied, the blending length generally being less than the total length of the screw. For example, when considering a melt processing unit that has an overall L/D of 40, the $L_B$/D ratio of the screw can be from about 1 to about 36, in some embodiments from about 4 to about 20, and in some embodiments, from about 5 to about 15. In one embodiment, the $L/L_B$ ratio can be from about 40 to about 1.1, from about 20 to about 2, or from about 10 to about 5.

Following addition of the crosslinking agent, the composition can be mixed to distribute the crosslinking agent throughout the composition and encourage reaction between the crosslinking agent, the impact modifier, and, in one embodiment, with the polyarylene sulfide.

The composition can also include one or more additives as are generally known in the art. For example, one or more fillers can be included in the composition. One or more fillers may generally be included in the composition an amount of from about 5 wt. % to about 70 wt. %, or from about 20 wt. % to about 65 wt. % by weight of the composition.

The filler can be added to the thermoplastic composition according to standard practice. For instance, the filler can be added to the composition at a downstream location of the melt processing unit. For example, a filler may be added to the composition in conjunction with the addition of the crosslinking agent. However, this is not a requirement of a formation process and the filler can be added separately from the crosslinking agent and either upstream or downstream of the point of addition of the crosslinking agent. In addition, a filler can be added at a single feed location, or may be split and added at multiple feed locations along the melt processing unit.

A filler can be an electrically conductive filler such as, without limitation, carbon black, graphite, graphene, carbon fiber, carbon nanotubes, a metal powder, and so forth. In those embodiments in which the thermoplastic composition includes electrically conductive fillers, for instance when the thermoplastic composition is utilized in forming a fuel line, adequate electrically conductive filler can be included such that the composition has a volume specific resistance of equal to or less than about $10^9$ ohms cm.

In one embodiment, a fibrous filler can be included in the thermoplastic composition. The fibrous filler may include one or more fiber types including, without limitation, polymer fibers, glass fibers, carbon fibers, metal fibers, basalt fibers, and so forth, or a combination of fiber types. In one embodiment, the fibers may be chopped fibers, continuous fibers, or fiber rovings (tows).

Fiber sizes can vary as is known in the art. In one embodiment, the fibers can have an initial length of from about 3 mm to about 5 mm. In another embodiment, for instance when considering a pultrusion process, the fibers can be continuous fibers. Fiber diameters can vary depending upon the particular fiber used. The fibers, for instance, can have a diameter of less than about 100 μm, such as less than about 50 μm. For instance, the fibers can be chopped or continuous fibers and can have a fiber diameter of from about 5 μm to about 50 μm, such as from about 5 μm to about 15 μm.

The fibers may be pretreated with a sizing as is generally known. In one embodiment, the fibers may have a high yield or small K numbers. The tow is indicated by the yield or K number. For instance, glass fiber tows may have 50 yield and up, for instance from about 115 yield to about 1200 yield.

Other fillers can alternatively be utilized or may be utilized in conjunction with a fibrous filler. For instance, a particulate filler can be incorporated in the composition. In general, particulate fillers can encompass any particulate material having a median particle size of less than about 750 μm, for instance less than about 500 μm, or less than about 100 μm. In one embodiment, a particulate filler can have a median particle size in the range of from about 3 μm to about 20 μm. In addition, a particulate filler can be solid or hollow, as is known. Particulate fillers can also include a surface treatment, as is known in the art.

Particulate fillers can encompass one or more mineral fillers. For instance, the thermoplastic composition can include one or more mineral fillers in an amount of from about 1 wt. % to about 60 wt. % of the composition. Mineral fillers may include, without limitation, silica, quartz powder, silicates such as calcium silicate, aluminum silicate, kaolin, talc, mica, clay, diatomaceous earth, wollastonite, calcium carbonate, and so forth.

When incorporating multiple fillers, for instance an electrically conductive filler, a particulate filler and a fibrous filler, the fillers may be added together or separately to the melt processing unit. For instance, a particulate filler can be added to the main feed with the polyarylene sulfide or downstream prior to addition of a fibrous filler, and a fibrous filler can be added further downstream of the addition point of the particulate filler. In general, a fibrous filler can be added downstream of any other fillers such as a particulate filler, though this is not a requirement.

In one embodiment, the thermoplastic composition can include a UV stabilizer as an additive. For instance, the thermoplastic composition can include a UV stabilizer in an amount of between about 0.5 wt. % and about 15 wt. %, between about 1 wt. % and about 8 wt. %, or between about 1.5 wt. % and about 7 wt. % of a UV stabilizer. One particularly suitable UV stabilizer that may be employed is a hindered amine UV stabilizer. Suitable hindered amine UV stabilizer compounds may be derived from a substituted piperidine, such as alkyl-substituted piperidyl, piperidinyl, piperazinone, alkoxypiperidinyl compounds, and so forth. For example, the hindered amine may be derived from a 2,2,6,6-tetraalkylpiperidinyl. The hindered amine may, for example, be an oligomeric or polymeric compound having a number average molecular weight of about 1,000 or more, in some embodiments from about 1000 to about 20,000, in some embodiments from about 1500 to about 15,000, and in some embodiments, from about 2000 to about 5000. Such compounds typically contain at least one 2,2,6,6-tetraalkylpiperidinyl group (e.g., 1 to 4) per polymer repeating unit. One particularly suitable high molecular weight hindered amine is commercially available from Clariant under the designation Hostavin® N30 (number average molecular weight of 1200). Another suitable high molecular weight hindered amine is commercially available from Adeka Palmarole SAS under the designation ADK STAB® LA-63 and ADK STAB® LA-68.

In addition to the high molecular hindered amines, low molecular weight hindered amines may also be employed. Such hindered amines are generally monomeric in nature and have a molecular weight of about 1000 or less, in some embodiments from about 155 to about 800, and in some embodiments, from about 300 to about 800.

Other suitable UV stabilizers may include UV absorbers, such as benzotriazoles or benzopheones, which can absorb UV radiation.

An additive that may be included in a thermoplastic composition is one or more colorants as are generally known in the art. For instance, the composition can include from about 0.1 wt. % to about 10 wt. %, or from about 0.2 wt. % to about 5 wt. % of one or more colorants. As utilized herein, the term "colorant" generally refers to any substance that can impart color to a material. Thus, the term "colorant" encompasses both dyes, which exhibit solubility in an aqueous solution, and pigments, that exhibit little or no solubility in an aqueous solution.

Examples of dyes that may be used include, but are not limited to, disperse dyes. Suitable disperse dyes may include those described in "Disperse Dyes" in the Color Index, $3^{rd}$ edition. Such dyes include, for example, carboxylic acid group-free and/or sulfonic acid group-free nitro, amino, aminoketone, ketoninime, methine, polymethine, diphenylamine, quinoline, benzimidazole, xanthene, oxazine and coumarin dyes, anthraquinone and azo dyes, such as mono- or di-azo dyes. Disperse dyes also include primary red color disperse dyes, primary blue color disperse dyes, and primary yellow color dyes Pigments that can be incorporated in a thermoplastic composition can include, without limitation, organic pigments, inorganic pigments, metallic pigments, phosphorescent pigments, fluorescent pigments, photochromic pigments, thermochromic pigments, iridescent pigments, and pearlescent pigments. The specific amount of pigment can depends upon the desired final color of the product. Pastel colors are generally achieved with the addition of titanium dioxide white or a similar white pigment to a colored pigment.

Other additives that can be included in the thermoplastic composition can encompass, without limitation, antimicrobials, lubricants, pigments or other colorants, impact modifiers, antioxidants, stabilizers (e.g., heat stabilizers including organophosphites such as Doverphos® products available from Dover Chemical Corporation), surfactants, flow promoters, solid solvents, and other materials added to enhance properties and processability. Such optional materials may be employed in the thermoplastic composition in conventional amounts and according to conventional processing techniques, for instance through addition to the thermoplastic composition at the main feed throat. Beneficially, the thermoplastic composition can exhibit desirable characteristics without the addition of plasticizers. For instance, the composition can be free of plasticizers such as phthalate esters, trimellitates, sebacates, adipates, gluterates, azelates, maleates, benzoates, and so forth.

Following addition of all components to the thermoplastic composition, the composition is thoroughly mixed in the remaining section(s) of the extruder and extruded through a die. The final extrudate can be pelletized and stored prior to formation of a fuel line or may be directly fed to a formation process.

Any known process can be employed without any particular limitation for manufacturing a fuel line. For instance, when considering formation of a multi-layer fuel line, the layers forming the wall of the fuel line can be form by an extrusion process or one or more other conventional processes, such as, for example, co-extrusion, dry lamination, sandwich lamination, coextrusion coating, and so forth. Adjacent layers can be formed simultaneously by a co-extrusion method, i.e., extruding the molten materials for those layers concentrically and simultaneously, and causing them to adhere to each other. Co-extrusion may be performed by using any known apparatus including co-extrusion heads. In general, co-extrusion can be used in forming a multi-layer fuel line having from two to about six layers.

By way of example, in forming a three-layered fuel line 70 as illustrated in FIG. 4, the thermoplastic composition, a polyamide composition, and a thermoplastic elastomer composition can be separately fed into three different extruders. The separate extrusion melts from those three extruders can then be introduced into one die under pressure. While producing three different tubular melt flows, those melt flows can be combined in the die in such a manner that the melt flow of the thermoplastic composition forms the inner layer 71, that of the polyamide composition forms the intermediate layer 72, and that of the thermoplastic elastomer composition forms the outer layer 73, and the thus-combined melt flows are co-extruded out of the die to produce a three-layered fuel line 70.

Co-extrusion is not a requirement of an extrusion formation process, however, and in other embodiments an outer layer can be formed on a pre-formed layer(s). For instance, an outer layer can be formed by extrusion about one or more pre-formed inner layers (inner wall layer, or inner and intermediate wall layers), though any other method can also be employed.

A fuel line or a layer of a fuel line can be formed according to an extrusion process. For example, an extrusion process utilizing a simple or barrier type screw can be utilized and, in one embodiment, a mixing tip need not be utilized in the process. The compression ratio for an extrusion process can be between about 2.5:1 and about 4:1. For instance, the compression ratio can be about 25% feed, about 25% transition, and about 50% metering. The ratio of the barrel length to the barrel diameter (L/D) can be from about 16 to about 24. An extrusion process can also utilize other standard components as are known in the art such as, for example, breaker plates, screen packs, adapters, a die, and a vacuum tank. The vacuum tank can generally include a sizing sleeve/calibration ring, tank seals.

When forming a fuel line according to an extrusion process, the thermoplastic composition can first be dried, for instance at a temperature of from about 90° C. to about 100° C. for about three hours. It may be beneficial to avoid drying for an extensive length of time so as to avoid discoloration of the composition. The extruder can exhibit different temperatures in different zones, as is known. For instance, in one embodiment, the extruder can include at least four zones, with the temperature of the first zone from about 276° C. to about 288° C., the temperature of the second zone from about 282° C. to about 299° C., the temperature of the third zone from about 282° C. to about 299° C., and the temperature of the fourth zone from about 540° C. to about 580° C. Meanwhile, the temperature of the die can be from about 293° C. to about 310° C., and the vacuum tank water can be from about 20° C. to about 50° C.

Typically, the head pressure can be from about 100 pounds per square inch (psi) (about 690 kPa) to about 1000 psi (about 6900 kPa), and the head pressure can be adjusted to achieve a stable melt flow, as is known. For instance, the head pressure can be reduced by increasing the extruder zone temperature, by increasing the extruder screw rotations per minute, reducing the screen pack mesh size and/or the number of screens. In general, the line speed can be from about 4 meters per minute to about 15 meters per minute. Of course, the actual line speed can depend upon the final dimension of the fuel line, the aesthetics of the final product and process stability.

The die swell during an extrusion process can generally be negligible. A draw down of about 1.2 to about 1.7 can generally be utilized, as a higher draw down can negatively affect the final properties of the fuel line, depending on other processing conditions. Die drool can generally be avoided by drying the resin adequately prior to extrusion as well as by maintaining the melt temperature at less than about 304° C.

In one embodiment, a fuel line or a layer of a fuel line extruded from the thermoplastic composition can have a wall thickness of between about 0.5 millimeters to about 5 millimeters, though fuel lines having larger wall thickness can be formed from the composition as desired. The calibration ring inner diameter can decide the outer diameter of the fuel line and will generally be less than the outer diameter of the die, as is known. The inner diameter of the fuel line can be utilized to determine the desired outer diameter of the mandrel and the line speed, as is known.

A corrugated fuel line having a corrugated portion along at least a part of its wall length can be formed in one embodiment by extruding a molten resin into a smooth tube and forming a corrugated portion in its wall by an appropriate corrugating mold or like device, though any other method can also be employed.

Figure 6:
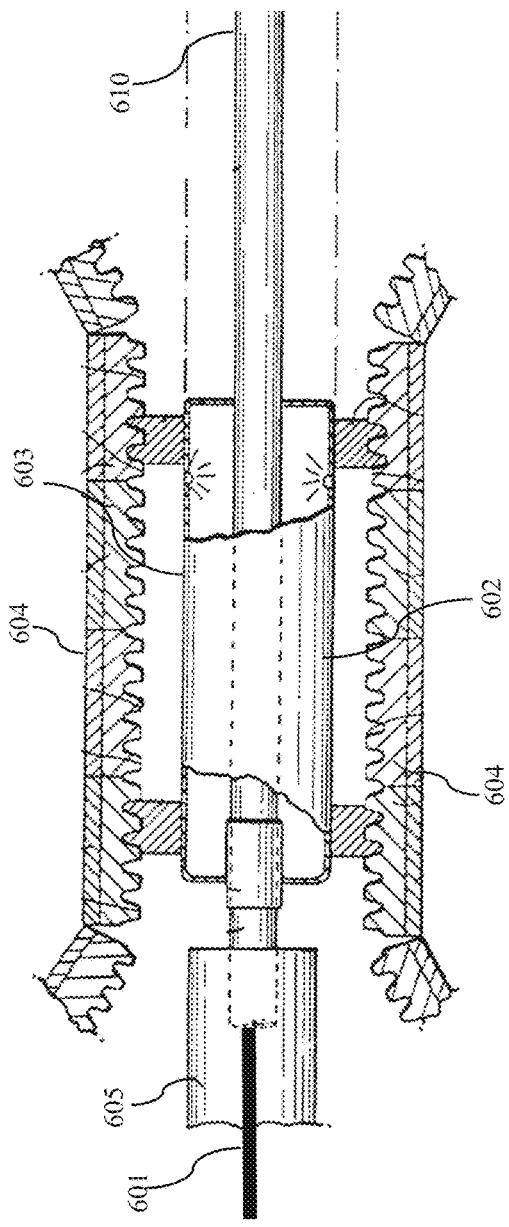
FIG. 6 illustrates a continuous blow molding process as may be utilized in forming a fuel line from the thermoplastic composition.

A fuel line can also be formed through utilization of a blow molding process to form one or more layers of a fuel line. By way of example, FIG. 6 presents a schematic illustration of one method as may be utilized in forming a fuel line according to a continuous blow molding process. In a continuous process, a stationary extruder (not shown) can plasticize the molten thermoplastic composition through a head to form a continuous parison 601. An accumulator 605 can be used to support the parison and prevent sagging prior to molding. The parison may be fed to a mold formed of articulated sections 602, 603 that travel in conjunction with the continuous parison on a mold conveyor assembly 604. Air under pressure is applied to the parison to blow mold the thermoplastic composition within the mold. After the thermoplastic composition has been molded and sufficiently cooled within the mold as the mold and thermoplastic composition travel together, the mold segments are separated from one another and the formed line 606 is removed from the conveyor and taken up, as on a take-up reel (not shown). The fuel line can then be cut to the desired length form the line 606 thus formed.

Additional layers can be formed on a blow molded layer according to an extrusion process, for instance to form an outer layer on a pre-formed layer, or according to a second blow molding process, for instance to form an inner layer on a pre-formed layer.

Surface treatments can be carried out on pre-formed layers prior to formation of or attachment to an adjacent layer so as to improve adhesion between adjacent layers. For example, plasma treatment or corona treatment as is generally known can be carried out to improve adhesion between adjacent layers of a multi-layer fuel line.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Formation and Test Methods

Injection Molding Process:

Tensile bars are injection molded to ISO 527-1 specifications according to standard ISO conditions.

Melt Viscosity:

All materials are dried for 1.5 hours at 150° C. under vacuum prior to testing. The melt viscosity is measured on a capillary rheometer at 316° C. and 400 sec$^{-1}$ with the viscosity measurement taken after five minutes of constant shear.

Tensile Properties:

Tensile properties including tensile modulus, yield stress, yield strain, strength at break, elongation at yield, elongation at break, etc. are tested according to ISO Test No. 527 (technically equivalent to ASTM D638). Modulus, strain, and strength measurements are made on the same test strip sample having a length of 80 mm, thickness of 10 mm, and width of 4 mm. The testing temperature is 23° C., and the testing speeds are 5 or 50 mm/min.

Flexural Properties:

Flexural properties including flexural strength and flexural modulus are tested according to ISO Test No. 178 (technically equivalent to ASTM D790). This test is performed on a 64 mm support span. Tests are run on the center portions of uncut ISO 3167 multi-purpose bars. The testing temperature is 23° C. and the testing speed is 2 mm/min.

Deflection Temperature Under Load ("DTUL"):

The deflection under load temperature was determined in accordance with ISO Test No. 75-2 (technically equivalent to ASTM D648-07). More particularly, a test strip sample having a length of 80 mm, thickness of 10 mm, and width of 4 mm was subjected to an edgewise three-point bending test in which the specified load (maximum outer fibers stress) was 1.8 Megapascals. The specimen was lowered into a silicone oil bath where the temperature is raised at 2° C. per minute until it deflects 0.25 mm (0.32 mm for ISO Test No. 75-2).

Notched Charpy Impact Strength:

Notched Charpy properties are tested according to ISO Test No. ISO 179-1) (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C., –30° F., or –40° F. as reported below.

Unnotched Charpy Impact Strength:

Unnotched Charpy properties are tested according to ISO Test No. 180 (technically equivalent to ASTM D256). The test is run using a Type 1 specimen (length of 80 mm, width of 10 mm and thickness of 4 mm). Specimens are cut from the center of a multi-purpose bare using a single tooth milling machine. The testing temperature is 23° C.

Izod Notched Impact Strength:

Notched Izod properties are tested according to ISO Test No. 180 (technically equivalent to ASTM D256, Method A). This test is run using a Type A notch. Specimens are cut from the center of a multi-purpose bar using a single tooth milling machine. The testing temperature is 23° C.

Density and Specific Gravity:

Density was determined according to ISO Test No. 1183 (technically equivalent to ASTM D792). The specimen was weighed in air then weighed when immersed in distilled water at 23° C. using a sinker and wire to hold the specimen completely submerged as required.

Vicat Softening Temperature:

Vicat Softening temperature was determined according to method A, with a load of 10 N and according to method B with a load of 50 N as described in ISO Test No. 306 (technically equivalent to ASTM D1525), both of which utilized a heating rate of 50 K/h.

Water absorption was determined according to ISO Test No. 62. The test specimens are immersed in distilled water at 23° C. until the water absorption essentially ceases (23° C./sat).

Complex Viscosity:

Complex viscosity is determined by a Low shear sweep (ARES) utilizing an ARES-G2 (TA Instruments) testing machine equipped with 25 mm SS parallel plates and using TRIOS software. A dynamic strain sweep was performed on a pellet sample prior to the frequency sweep, in order to find LVE regime and optimized testing condition. The strain sweep was done from 0.1% to 100%, at a frequency 6.28 rad/s. The dynamic frequency sweep for each sample was obtained from 500 to 0.1 rad/s, with strain amplitude of 3%. The gap distance was kept at 1.5 mm for pellet samples. The temperature was set at 310° C. for all samples.

Figure 7:
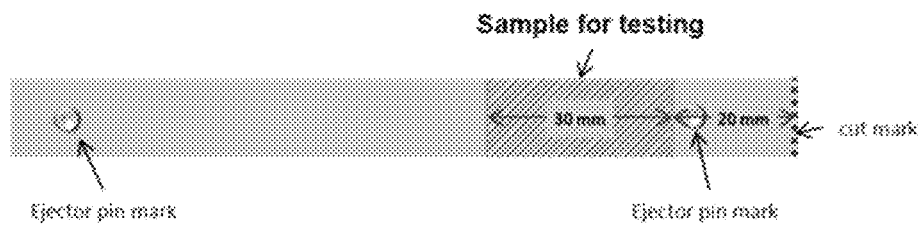
FIG. 7 illustrates the sample used in determination of melt strength and melt elongation of thermoplastic compositions described herein.

Melt strength and melt elongation is performed on ARES-G2 equipped EVF fixture. The flame bar sample was cut as shown in FIG. 7. The same area of flame bar was used for each run, in order to keep the crystallinity of test sample same and thus to minimize the variation between replicates. A transient strain was applied to each sample at 0.2/s rate. At least triplicate run was done for each sample to obtain a representative curve.

Permeation Resistance:

The fuel permeation studies were performed on samples according to SAE Testing Method No. J2665. For all samples, stainless-steel cups were used. Injection molded plaques with a diameter of 3 inches (7.6 centimeters) were utilized as test samples. The thickness of each sample was measured in 6 different areas. An O-ring Viton® fluoroelastomer was used as a lower gasket between cup flange and sample (Purchased from McMaster-Carr, cat#9464K57, A75). A flat Viton® fluoroelastomer (Purchased from McMaster-Carr, cat#86075K52, 1/16" thickness, A 75) was die-cut to 3 inch (7.6 cm) OD and 2.5 inch (6.35 cm) ID, and used as the upper gasket between the sample and the metal screen. The fuel, about 200 ml, was poured into the cup, the cup apparatus was assembled, and the lid was finger-tightened. This was incubated in a 40° C. oven for 1 hour, until the vapor pressure equilibrated and the lid was tightened to a torque 15 in-lb. The fuel loss was monitored gravimetrically, daily for the first 2 weeks followed by twice a week for the rest of the testing period. A blank run was done in the same manner with an aluminum disk (7.6 cm diameter, 1.5 mm thickness) and the result was subtracted from the samples. All samples were measured in duplicate. The normalized permeation rate was calculated following an equilibration period. The permeation rate for each sample was obtained from the slope of linear regression fitting of daily weight loss (gm/day). The normalized permeation rate was calculated by dividing the permeation rate by the effective permeation area and multiplying by average thickness of specimen. The average permeation rates are reported.

Example 1

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Disulfide: 2,2-dithiodibenzoic acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the disulfide was fed using a gravimetric feeder at barrel 6. Materials were further mixed then extruded through a strand die. The strands were water-quenched in a bath to solidify and granulated in a pelletizer.

Compositions of the samples are provided in Table 1, below. Amounts are provided as weight percentages based upon the weight of the sample.

TABLE 1

| Component | Addition Point | Sample 1 | Sample 2 |
|---|---|---|---|
| Lubricant | main feed | 0.3 | 0.3 |
| Disulfide | barrel 6 | — | 1.0 |
| Impact Modifier | main feed | 25.0 | 25.0 |
| Polyarylene Sulfide | main feed | 74.7 | 73.7 |
| Total | | 100.0 | 100.0 |

Following formation, samples were tested for a variety of physical characteristics. Results are provided in Table 2, below.

TABLE 2

| | Sample 1 | Sample 2 |
|---|---|---|
| Melt Viscosity (poise) | 3328 | 4119 |
| Tensile Modulus (MPa) | 1826 | 1691 |
| Tensile Break Stress (MPa) | 43.73 | 44.98 |
| Tensile Break Strain (%) | 96.37 | 135.12 |
| Std. Dev. | 39.07 | 34.40 |
| Notched Charpy Impact Strength at 23° C. (kJ/m$^2$) | 61.03 | 53.00 |

Samples were annealed at 230° C. for 2 hours and re-tested for physical characteristics. Results are provided in Table 3, below.

TABLE 3

| | Sample 1 | Sample 2 |
|---|---|---|
| Tensile Modulus (MPa) | 1994.00 | 1725.00 |
| Tensile Break Stress (MPa) | 45.04 | 45.20 |
| Tensile Break Strain (%) | 58.01 | 73.76 |
| Std. Dev. | 6.60 | 4.78 |

As can be seen, Sample 2 exhibited better tensile elongation and lower modulus before and after annealing. However, no improvement in impact strength was seen, which is believed to be due to a chain scission reaction between the disulfide and the polypropylene sulfide.

Example 2

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. The disulfide was fed using a gravimetric feeder at various locations in the extruder; at the main feed throat, at barrel 4 and barrel 6. The crosslinking agent was fed at barrel 6. Materials were further mixed then extruded through a strand die. The strands were water-quenched in a bath to solidify and granulated in a pelletizer.

Comparative Samples 3 and 4 were formed of the same composition and compounded by use of a different screw design.

TABLE 4

| | Addition Point | 3 | 4 | 5 | 6 | 7 | 8 | 9 | 10 |
|---|---|---|---|---|---|---|---|---|---|
| Lubricant | main feed | 0.3 | 0.3 | 0.3 | 0.3 | 0.3 | 0.3 | 0.3 | 0.3 |
| Crosslinking Agent | barrel 6 | — | — | 0.5 | 1.0 | 1.0 | 0.5 | 0.5 | 0.5 |
| Disulfide | main feed | — | — | — | — | — | 0.30 | — | — |
| Disulfide | barrel 4 | — | — | — | — | — | — | 0.3 | — |
| Disulfide | barrel 6 | — | — | — | — | — | — | — | 0.3 |
| Impact Modifier | main feed | 15.0 | 15.0 | 15.0 | 15.0 | 10.0 | 15.0 | 15.0 | 15.0 |
| Polyarylene Sulfide | main feed | 84.7 | 84.7 | 84.2 | 83.7 | 88.7 | 83.9 | 83.9 | 83.9 |
| Total | | 100.0 | 100.0 | 100.0 | 100.0 | 100.0 | 100.0 | 100.0 | 100.0 |

Following formation, tensile bars were formed and tested for a variety of physical characteristics. Results are provided in Table 5, below.

TABLE 5

|  | Sample 3 | Sample 4 | Sample 5 | Sample 6 | Sample 7 | Sample 8 | Sample 9 | Sample 10 |
|---|---|---|---|---|---|---|---|---|
| Melt Viscosity (poise) | 2423 | — | 2659 | 2749 | 2067 | 2349 | 2310 | 2763 |
| Density (g/cm$^3$) | — | 1.28 | — | 1.25 | — | — | — | — |
| Tensile Modulus (MPa) | 2076 | 2800 | 2177 | 2207 | 2551 | 1845 | 2185 | 2309 |
| Tensile Break Stress (MPa) | 46.13 | — | 45.40 | 48.27 | 51.71 | 46.47 | 47.16 | 47.65 |
| Tensile Break Strain (%) | 33.68 | 25 | 43.97 | 35.94 | 26.90 | 47.51 | 40.85 | 63.85 |
| Elongation at Yield (%) | 5.17 | 5 | 5.59 | 7.49 | 4.5 | 11.78 | 6.94 | 7.00 |
| Yield Stress (MPa) | 51.07 | 52 | 50.76 | 51.62 | 59.63 | 51.07 | 52.56 | 51.88 |
| Notched Charpy Impact Strength at 23° C. (kJ/m$^2$) | 22.30 | 30 | 23.90 | 39.40 | 14.80 | 12.50 | 19.70 | 39.90 |
| Notched Charpy Impact Strength at −30° C. (kJ/m$^2$) | 7.8 | 7 | — | 10 | — | — | — | 10.8 |
| DTUL (° C.) | — | 100 | — | 102 | — | — | — | — |
| Melt Temp. (° C.) | 280 | 280 | 280 | 280 | 280 | 280 | 280 | 280 |
| Water absorption (%) | — | 0.05 | — | 0.05 | — | — | — | — |

Samples were annealed at 230° C. for 2 hours and re-tested for physical characteristics. Results are provided in Table 6, below.

TABLE 6

|  | Sample 3 | Sample 4 | Sample 5 | Sample 6 | Sample 7 | Sample 8 | Sample 9 | Sample 10 |
|---|---|---|---|---|---|---|---|---|
| Tensile Modulus (MPa) | 2383 | — | 2339 | 2279 | 2708 | 2326 | 2382 | 2491 |
| Tensile Break Stress (MPa) | 52.70 | — | 53.96 | 53.11 | 61.10 | 56.74 | 54.81 | 55.25 |
| Tensile Break Strain (%) | 29.42 | — | 20.97 | 35.76 | 20.34 | 31.37 | 41.23 | 49.03 |
| Std. Dev. | 6.84 | — | 6.95 | 6.66 | 5.40 | 2.83 | 2.65 | 3.74 |

As can be seen, the highest tensile elongation and highest impact strength were observed for Sample 10, which includes both the crosslinking agent and the disulfide added at the same point downstream during processing.

Figure 8:
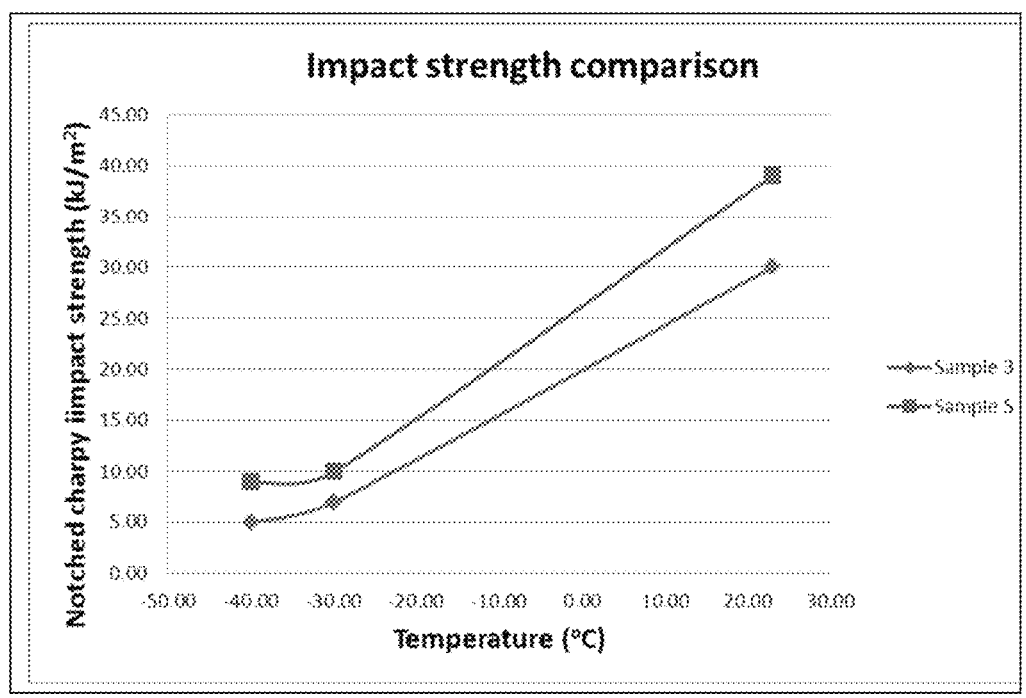
FIG. 8 illustrates the effect of temperature change on the notched Charpy impact strength of a thermoplastic composition as described herein and that of a comparison composition.

FIG. 8 illustrates the relationship of notched Charpy impact strength over temperature change for Sample 3 and for Sample 6. As can be seen, the thermoplastic composition of Sample 6 exhibits excellent characteristics over the entire course of the temperature change, with a higher rate of increase in impact strength with temperature change as compared to the comparison material.

FIG. 9 is a scanning electron microscopy image of the polyarylene sulfide used in forming the sample 3 composition (FIG. 9A) and the Sample 6 composition (FIG. 9B). As can be seen, there is no clear boundary between the polyarylene sulfide and the impact modifier in the composition of FIG. 9B (sample 6).

Tensile bar test specimens of samples 3, 6, and 10 were immersed in 10 wt. % sulfuric acid for 500 hours at either 40° C. or 80° C. Tensile properties and impact properties were measured before and after the acid exposure. Results are summarized in Table 7 below.

TABLE 7

|  | Sample 3 | Sample 6 | Sample 10 |
|---|---|---|---|
| Initial properties | | | |
| Tensile Modulus (MPa) | 2076 | 2207 | 2309 |
| Tensile Break Stress (MPa) | 46.13 | 48.27 | 47.65 |
| Tensile Break Strain (%) | 33.68 | 35.94 | 63.85 |
| Charpy notched impact strength at 23° C. (kJ/m$^2$) | 22.30 | 39.40 | 39.90 |
| Properties after 500 hours exposure in sulfuric acid at 40° C. | | | |
| Tensile Modulus (MPa) | 2368 | 2318 | 2327 |
| Tensile Break Stress (MPa) | 48.83 | 48.48 | 48.53 |
| Tensile Break Strain (%) | 10.99 | 28.28 | 30.05 |
| Charpy notched impact strength at 23° C. (kJ/m$^2$) | 18.4 | 33.6 | 35.9 |
| Loss in Charpy notched impact strength (%) | 18 | 15 | 15 |
| Properties after 500 hour exposure in sulfuric acid at 80° C. | | | |
| Tensile Modulus (MPa) | 2341 | 2356 | 2354 |
| Tensile Break Stress (MPa) | 49.61 | 48.04 | 48.86 |
| Tensile Break Strain (%) | 10.60 | 19.88 | 26.32 |

TABLE 7-continued

|  | Sample 3 | Sample 6 | Sample 10 |
|---|---|---|---|
| Charpy notched impact strength at 23° C. (kJ/m$^2$) | 9.2 | 31.0 | 34.0 |
| Loss in Charpy notched impact strength (%) | 59 | 21 | 15 |

The results in the change in Charpy notched impact strength over time during exposure to the acid solution at an elevated temperature are illustrated in FIG. 10. As can be seen, the relative loss of strength of samples 6 and 10 is much less than the comparison sample.

Example 3

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the feed throat in the first barrel by means of a gravimetric feeder. The crosslinking agent was fed using a gravimetric feeder at the main feed throat and at barrel 6. Materials were further mixed then extruded through a strand die. The strands were water-quenched in a bath to solidify and granulated in a pelletizer.

Compositions of the samples are provided in Table 8, below. Amounts are provided as weight percentages based upon the weight of the sample.

TABLE 8

| Component | Addition Point | Sample 11 | Sample 12 | Sample 13 | Sample 14 |
|---|---|---|---|---|---|
| Lubricant | main feed | 0.3 | 0.3 | 0.3 | 0.3 |
| Crosslinking Agent | main feed | — | 0.5 | 1.0 | — |
| Crosslinking Agent | barrel 6 | — | — | — | 1.0 |
| Impact Modifier | main feed | 15.0 | 15.0 | 15.0 | 15.0 |
| Polyarylene Sulfide | main feed | 84.7 | 84.2 | 83.7 | 83.7 |
| Total |  | 100.0 | 100.0 | 100.0 | 100.0 |

Following formation, tensile bars formed of the samples were tested for a variety of physical characteristics. Results are provided in Table 9, below.

TABLE 9

|  | Sample 11 | Sample 12 | Sample 13 | Sample 14 |
|---|---|---|---|---|
| Melt Viscosity (poise) | 2649 | 2479 | 2258 | 3778 |
| Tensile Modulus (MPa) | 2387 | 2139 | 2150 | 1611 |
| Tensile Break Stress (MPa) | 46.33 | 49.28 | 51.81 | 42.44 |
| Tensile Break Strain (%) | 24.62 | 22.60 | 14.45 | 53.62 |
| Std. Dev. | 9.19 | 1.51 | 2.23 | 1.90 |
| Notched Charpy Impact Strength at 23° C. (kJ/m$^2$) | 27.50 | 8.50 | 6.00 | 39.30 |
| Std. Dev. | 2.7 | 1.10 | 0.60 | 2.10 |

As can be seen, upstream feed of the crosslinking agent decreased the impact properties of the composition, while downstream feed increased the tensile elongation by 118% and room temperature impact strength by 43%.

Example 4

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the feed throat in the first barrel by means of a gravimetric feeder. The crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 10, below. Amounts are provided as weight percentages based upon the weight of the sample.

TABLE 10

| Component | Addition Point | Sample 15 | Sample 16 | Sample 17 | Sample 18 |
|---|---|---|---|---|---|
| Lubricant | main feed | 0.3 | 0.3 | 0.3 | 0.3 |
| Crosslinking Agent | barrel 6 | 1.0 | 1.7 | 1.0 | 1.7 |
| Impact Modifier | main feed | 25.0 | 25.0 | 15.0 | 15.0 |
| Polyarylene Sulfide | main feed | 73.7 | 73.0 | 83.7 | 83.0 |
| Total |  | 100.0 | 100.0 | 100.0 | 100.0 |

Following formation, tensile bars formed of the samples were tested for a variety of physical characteristics. Results are provided in Table 11, below.

TABLE 11

|  | Sample 15 | Sample 16 | Sample 17 | Sample 18 |
|---|---|---|---|---|
| Melt Viscosity (poise) | 4255 | 4198 | 2522 | 2733 |
| Density (g/cm$^3$) | 1.2 | — | — | — |
| Tensile Modulus (MPa) | 1582.00 | 1572.00 | 2183.00 | 2189.00 |
| Tensile Break Stress (MPa) | 45.59 | 46.29 | 48.98 | 49.26 |
| Tensile Break Strain (%) | 125.92 | 116.40 | 66.13 | 48.24 |
| Std. Dev. | 19.79 | 9.97 | 15.36 | 7.80 |
| Elongation at Yield (%) | 23 | — | — | — |
| Yield Stress (MPa) | 42 | — | — | — |
| Flex Modulus (MPa) | 1946.00 | 1935.00 | 2389.00 | 2408.00 |
| Flexural Stress @3.5% (MPa) | 48.30 | 48.54 | 68.55 | 68.12 |
| Notched Charpy Impact Strength at 23° C. (kJ/m$^2$) | 55.60 | 51.80 | 43.60 | 19.10 |
| Std. Dev. | 1.00 | 1.40 | 1.50 | 1.50 |
| Notched Charpy Impact Strength at −30° C. (kJ/m$^2$) | 13 | — | — | — |
| Notched Charpy Impact Strength at −40° C. (kJ/m$^2$) | 13.30 | 12.10 | 11.26 | 8.70 |
| Std. Dev. | 1.50 | 0.90 | 0.26 | 0.50 |
| DTUL (1.8 MPa) (° C.) | 97.20 | 97.60 | 101.70 | 100.90 |
| Water absorption (%) | 0.07 | — | — | — |

Example 5

Materials as described in Example 1 were utilized except for the polyarylene sulfide, which was Fortron® 0320 linear polyphenylene sulfide available from Ticona Engineering Polymers of Florence, Ky. Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide and impact modifier were fed to the feed throat in the first barrel by means of a gravimetric feeder. The crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 12, below. Amounts are provided as weight percentages based upon the weight of the sample.

TABLE 12

| Component | Addition Point | Sample 19 | Sample 20 | Sample 21 | Sample 22 | Sample 23 |
|---|---|---|---|---|---|---|
| Crosslinking Agent | barrel 6 | — | — | — | 0.1 | 0.2 |
| Impact Modifier | main feed | — | 1.5 | 3.0 | 1.5 | 3.0 |
| Polyarylene Sulfide | main feed | 100.0 | 98.5 | 97.0 | 98.4 | 96.8 |
| Total | | 100.0 | 100.0 | 100.0 | 100.0 | 100.0 |

Following formation, tensile bars formed of the samples were tested for a variety of physical characteristics. Results are provided in Table 13, below.

TABLE 13

| | Sample 19 | Sample 20 | Sample 21 | Sample 22 | Sample 23 |
|---|---|---|---|---|---|
| Melt Viscosity (poise) | 2435 | 2684 | 2942 | 2287 | 1986 |
| Tensile Modulus (MPa) | 3208 | 3207 | 3104 | 3245 | 3179 |
| Tensile Break Stress (MPa) | 67.20 | 72.94 | 59.06 | 63.95 | 60.80 |
| Tensile Break Strain (%) | 2.46 | 4.54 | 11.96 | 6.31 | 11.40 |
| Std. Dev. | 0.32 | 1.11 | 1.24 | 2.25 | 3.53 |
| Flex Modulus (MPa) | 3103.00 | 3173.00 | 3031.00 | 3284.00 | 3156.00 |
| Flexural Stress @3.5% (MPa) | 105.76 | 104.74 | 100.21 | 109.09 | 104.81 |
| Notched Izod Impact Strength at 23° C. (kJ/m²) | 2.90 | 5.20 | 5.60 | 4.10 | 4.30 |
| Std. Dev. | 0.40 | 0.40 | 0.40 | 0.20 | 0.20 |
| DTUL (1.8 MPa) (° C.) | 105.60 | 104.00 | 103.70 | 104.20 | 104.80 |

Example 6

Materials utilized to form the compositions included the following:

Polyarylene sulfide: Fortron® 0214 linear polyphenylene sulfide available from Ticona Engineering Polymers of Florence, Ky.

Impact Modifier: LOTADER® 4720—a random terpolymer of ethylene, ethyl acrylate and maleic anhydride available from Arkema, Inc.

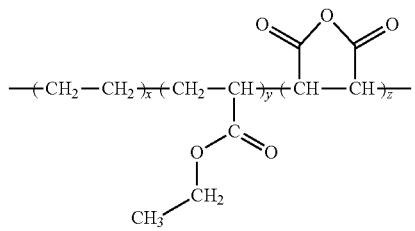

Crosslinking Agent: Hydroquinone

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at the main feed for samples 24 and 25 and at barrel 6 for samples 26 and 27. Materials were further mixed then extruded through a strand die. The strands were water-quenched in a bath to solidify and granulated in a pelletizer.

Compositions of the samples are provided in Table 14, below. Amounts are provided as weight percentages based upon the weight of the sample.

TABLE 14

| Component | Addition Point | Sample 24 | Sample 25 | Sample 26 | Sample 27 | Sample 28 |
|---|---|---|---|---|---|---|
| Lubricant | main feed | 0.3 | 0.3 | 0.3 | 0.3 | 0.3 |
| Crosslinking Agent | barrel 6 | — | — | — | 0.1 | 0.2 |
| Crosslinking Agent | main feed | — | 0.1 | 0.2 | — | — |
| Impact Modifier | main feed | 15.0 | 15.0 | 15.0 | 15.0 | 15.0 |
| Polyarylene Sulfide | main feed | 84.7 | 84.6 | 84.5 | 84.6 | 84.5 |
| Total | | 100.0 | 100.0 | 100.0 | 100.0 | 100.0 |

Following formation, samples were tested for a variety of physical characteristics. Results are provided in Table 15, below.

TABLE 15

| | Sample 24 | Sample 25 | Sample 26 | Sample 27 | Sample 28 |
|---|---|---|---|---|---|
| Melt Viscosity (poise) | 2435 | 2797 | 3251 | 2847 | 2918 |
| Tensile Modulus (MPa) | 2222 | 2164 | 2163 | 2184 | 2145 |
| Tensile Break Stress (MPa) | 52.03 | 45.17 | 46.53 | 45.47 | 46.39 |
| Tensile Break Strain (%) | 36.65 | 50.91 | 63.39 | 38.93 | 41.64 |
| Std. Dev. | 9.09 | 14.9 | 11.88 | 7.62 | 10.42 |
| Elongation at Yield (%) | 5.75 | 5.49 | 5.76 | 5.53 | 5.70 |
| Yield Stress (MPa) | 52.03 | 50.21 | 50.77 | 51.39 | 50.85 |
| Flexural Modulus (MPa) | 2358.00 | 2287.00 | 2286.00 | 2305.00 | 2281.00 |
| Flexural Stress @3.5% (MPa) | 70.51 | 68.25 | 68.03 | 69.23 | 68.23 |

TABLE 15-continued

|  | Sample 24 | Sample 25 | Sample 26 | Sample 27 | Sample 28 |
|---|---|---|---|---|---|
| Notched Charpy Impact Strength at 23° C. (kJ/m$^2$) | 29.80 | 44.60 | 50.60 | 42.30 | 45.90 |
| Std. Dev. | 4.10 | 2.40 | 1.90 | 1.90 | 1.60 |
| Notched Charpy Impact Strength at −40° C. (kJ/m$^2$) | 5.90 | 9.30 | 11.00 | 9.60 | 9.80 |
| Std. Dev. | 1.00 | 0.90 | 1.20 | 0.80 | 1.30 |
| DTUL (1.8 MPa) (° C.) | 99.10 | 93.90 | 98.20 | 100.10 | 99.00 |

Example 7

Materials utilized to form the compositions included the following:

Polyarylene sulfide:
PPS1—Fortron® 0203 linear polyphenylene sulfide available from Ticona Engineering Polymers of Florence, Ky.
PPS2—Fortron®0205 linear polyphenylene sulfide available from Ticona Engineering Polymers of Florence, Ky.
PPS3—Fortron®0320 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 16, below. Amounts are provided as weight percentages based upon the weight of the sample.

TABLE 16

| Component | Addition Point | Sample 29 | Sample 30 | Sample 31 | Sample 32 | Sample 33 | Sample 34 |
|---|---|---|---|---|---|---|---|
| Lubricant | main feed | 0.3 | 0.3 | 0.3 | 0.3 | 0.3 | 0.3 |
| Crosslinking Agent | barrel 6 |  | 1.0 |  | 1.0 |  | 1.0 |
| Impact Modifier | main feed | 15.0 | 15.0 | 15.0 | 15.0 | 15.0 | 15.0 |
| PPS1 | main feed | 84.7 | 83.7 |  |  |  |  |
| PPS2 | main feed |  |  | 84.7 | 83.7 |  |  |
| PPS3 | main feed |  |  |  |  | 84.7 | 83.7 |
| Total |  | 100.0 | 100.0 | 100.0 | 100.0 | 100.0 | 100.0 |

Following formation, samples were tested for a variety of physical characteristics. Results are provided in Table 17, below.

TABLE 17

|  | Sample 29 | Sample 30 | Sample 31 | Sample 32 | Sample 33 | Sample 34 |
|---|---|---|---|---|---|---|
| Tensile Modulus (MPa) | 2292 | 2374 | 2250 | 2427 | 2130 | 2285 |
| Tensile Break Stress (MPa) | 50.92 | 50.18 | 49.18 | 53.22 | 48.01 | 48.08 |
| Tensile Break Strain (%) | 5.79 | 2.84 | 23.79 | 34.73 | 23.55 | 45.42 |
| Std. Dev. | 0.99 | 0.18 | 11.96 | 4.01 | 18.57 | 18.94 |
| Flexural Modulus (MPa) | 2279.00 | 2382.00 | 2257.00 | 2328.00 | 2292.00 | 2294.00 |
| Flexural Stress @3.5% (MPa) | 71.11 | 74.94 | 69.72 | 72.39 | 67.95 | 68.95 |
| Notched Charpy Impact Strength at 23° C. (kJ/m$^2$) | 5.70 | 3.70 | 9.10 | 12.80 | 19.40 | 45.40 |
| Std. Dev. | 0.90 | 0.70 | 0.80 | 1.00 | 2.70 | 7.70 |
| Notched Charpy Impact Strength at −40° C. (kJ/m$^2$) | 3.00 | 2.50 | 5.10 | 5.00 | 5.10 | 8.00 |
| Std. Dev. | 0.70 | 0.30 | 0.60 | 0.30 | 0.40 | 1.00 |
| DTUL (1.8 MPa) (° C.) | 101.00 | 105.50 | 100.00 | 102.90 | 99.90 | 100.40 |

Example 8

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 18, below. Amounts are provided as weight percentages based upon the weight of the sample.

TABLE 18

| Component | Addition Point | Sample 35 | Sample 36 | Sample 37 | Sample 38 | Sample 39 | Sample 40 |
|---|---|---|---|---|---|---|---|
| Lubricant | main feed | 0.3 | 0.3 | 0.3 | 0.3 | 0.3 | 0.3 |
| Crosslinking Agent | barrel 6 | | 0.75 | | 1.25 | | 1.75 |
| Impact Modifier | main feed | 15.0 | 15.0 | 25.0 | 25.0 | 35.0 | 35.0 |
| Polyarylene Sulfide | main feed | 84.7 | 83.95 | 74.70 | 73.45 | 64.70 | 62.95 |
| Total | | 100.0 | 100.0 | 100.0 | 100.0 | 100.0 | 100.0 |

Following formation, samples were tested for a variety of physical characteristics. Results are provided in Table 19, below. Sample 39 was not injection moldable.

TABLE 19

| | Sample 35 | Sample 36 | Sample 37 | Sample 38 | Sample 39 | Sample 40 |
|---|---|---|---|---|---|---|
| Melt Viscosity (poise) | 2323 | 2452 | 2955 | 3821 | 2025 | 5462 |
| Tensile Modulus (MPa) | 2281 | 2298 | 2051 | 1721 | — | 1045 |
| Tensile Break Stress (MPa) | 47.09 | 49.09 | 47.29 | 46.18 | — | 39.81 |
| Tensile Break Strain (%) | 28.92 | 36.42 | 97.33 | 110.36 | — | 96.76 |
| Std. Dev. | 6.35 | 3.13 | 53.94 | 8.40 | — | 1.77 |
| Elongation at Yield (%) | 5.28 | 8.58 | 36.00 | 108.19 | — | 95.77 |
| Yield Stress (MPa) | 52.42 | 53.92 | 46.50 | 46.76 | — | 40.43 |
| Flexural Modulus (MPa) | 2388.00 | 2349.00 | 2210.00 | 1750.00 | — | 1209.00 |
| Flexural Stress @3.5% (MPa) | 71.52 | 71.70 | 63.15 | 50.52 | — | 34.41 |
| Notched Charpy Impact Strength at 23° C. (kJ/m$^2$) | 35.15 | 38.40 | 57.00 | 52.70 | — | 52.10 |
| Std. Dev. | 6.22 | 1.50 | 1.40 | 3.40 | — | 2.10 |
| Notched Charpy Impact Strength at −30° C. (kJ/m$^2$) | 8.20 | 10.70 | 8.70 | 18.10 | — | 14.10 |
| Std. Dev. | 1.50 | 1.60 | 0.20 | 0.90 | — | 0.80 |
| Notched Charpy Impact Strength at −40° C. (kJ/m$^2$) | 7.26 | 9.20 | 8.00 | 16.80 | — | 12.47 |
| Std. Dev. | 1.54 | 2.30 | 0.60 | 0.40 | — | 0.92 |
| DTUL (1.8 MPa) (° C.) | 99.90 | 103.60 | 98.10 | 99.30 | — | 92.70 |
| Water absorption (%) | — | — | — | — | — | 0.1 |

Example 9

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 20, below. Amounts are provided as weight percentages based upon the weight of the sample.

TABLE 20

| Component | Addition Point | Sample 41 | Sample 42 | Sample 43 | Sample 44 |
|---|---|---|---|---|---|
| Lubricant | main feed | 0.3 | 0.3 | 0.3 | 0.3 |
| Crosslinking Agent | barrel 6 | 1.0 | 1.1 | 1.25 | 1.25 |
| Impact Modifier | main feed | 15 | 20 | 25 | 30 |
| Polyarylene Sulfide | main feed | 83.7 | 78.6 | 73.45 | 68.45 |
| Total | | 100.0 | 100.0 | 100.0 | 100.0 |

Following formation, samples were tested for a variety of physical characteristics. Results are provided in Table 21, below.

TABLE 21

| | Sample 41 | Sample 42 | Sample 43 | Sample 44 |
|---|---|---|---|---|
| Specific Gravity (g/cm$^3$) | 1.25 | 1.20 | 1.15 | 1.20 |
| Tensile Modulus (MPa) (50 mm/min) | 2200 | 1600 | 1200 | 1700 |
| Tensile Break Strength (MPa) (50 mm/min) | 50 | 42 | 40 | 46 |
| Elongation at Break (%) (50 mm/min) | 40 | 100 | 90 | 75 |
| Yield Stress (MPa) (50 mm/min) | 55 | 42 | 40 | 48 |
| Yield Strain (%) (50 mm/min) | 9 | 25 | 90 | 15 |
| Flexural Modulus (MPa) | 2200 | 1700 | 1300 | 1900 |
| Flexural Strength @3.5% (MPa) | 68 | 50 | 40 | 56 |
| Notched Charpy Impact Strength at 23° C. (kJ/m$^2$) | 40 | 55 | 50 | 50 |
| Notched Charpy Impact Strength at −30° C. | 10 | 24 | 20 | 20 |
| Unnotched Charpy Impact Strength at 23° C. | Not broken | Not broken | Not broken | Not broken |
| DTUL (1.8 MPa) (° C.) | 102 | 100 | 95 | 100 |
| Water absorption (%) | 0.05 | 0.07 | 0.1 | 0.05 |
| Vicat softening temp. (A10N, ° C.) | 270 | 270 | 270 | 270 |
| Vicat softening temp. (B50N, ° C.) | 200 | 160 | 110 | 180 |
| Complex viscosity (0.1 rad/sec, 310° C.) (kPa/sec) | 79.994 | 289.27 | 455.19 | — |

Figure 11:
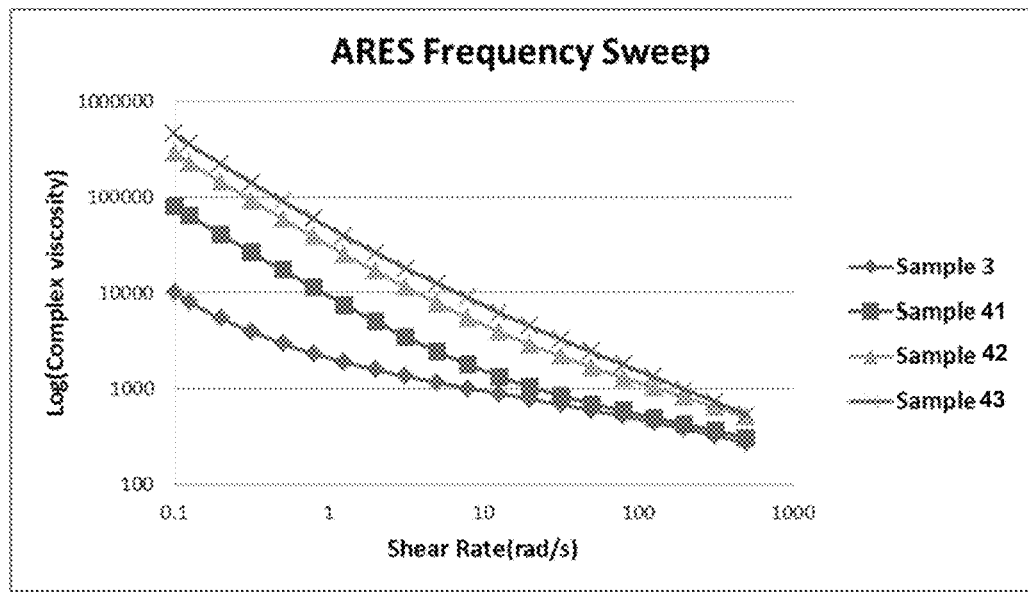
FIG. 11 provides the log of the complex viscosity obtained for thermoplastic compositions described herein as a function of the shear rate.
Figure 12:
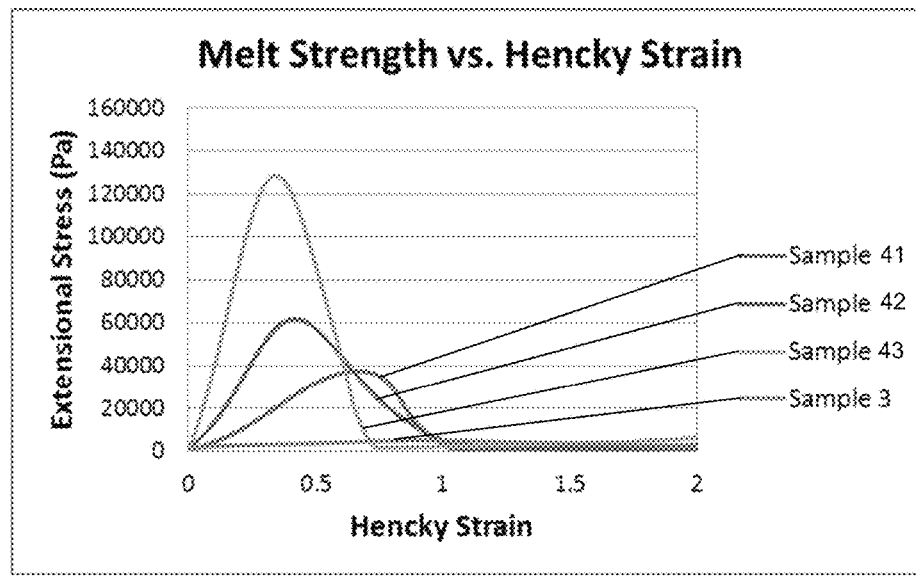
FIG. 12 provides the melt strength of thermoplastic compositions described herein as a function of the Hencky strain.
Figure 13:
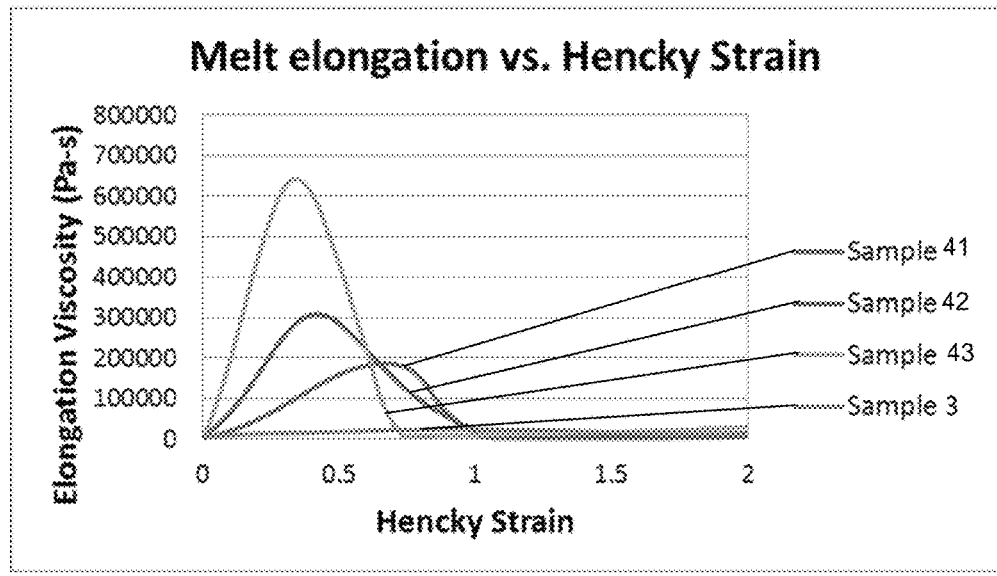
FIG. 13 provides the melt elongation for thermoplastic compositions described herein as a function of Hencky strain.

Samples 41, 42, and 43 were tested to determine complex viscosity as well as melt strength and melt elongation as a function of Hencky strain. As a comparative material, Sample 3 as described in Example 2 was utilized. Samples 41, 42 and 43 were done at 310° C. and sample 3 was done at 290° C. Results are shown in FIG. 11, FIG. 12, and FIG. 13.

Example 10

Figure 14:
FIG. 14 illustrates a blow molded container formed of the thermoplastic composition.
Figure 15A:
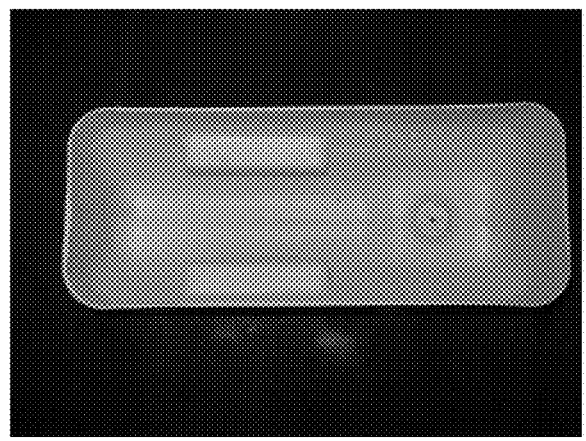
FIG. 15A and FIG. 15B are cross sectional images of the container shown in FIG. 14.
Figure 15B:
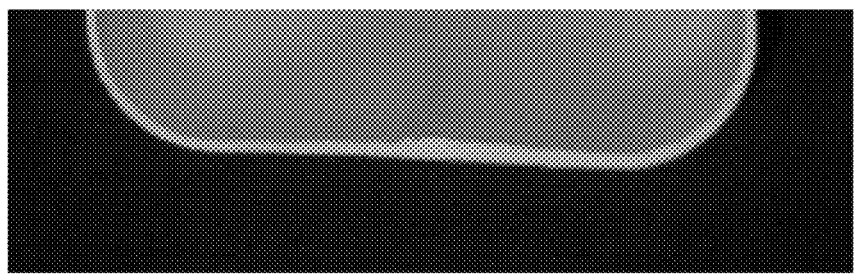

Sample 42 described in Example 9 was utilized to form a blow molded 1.6 gallon tank. The formed tank is illustrated in FIG. 14. Cross sectional views of the tank are presented in FIG. 15A and FIG. 15B. The formed tank has a good outer surface with regard to both visual inspection and feel. As shown in FIG. 15A, an even wall thickness (about 3 mm) was obtained and minimal sag was observed. As shown in FIG. 15B, the pinch-offs formed an excellent geometry.

Example 11

Samples 41, 42, and 43 described in Example 9 were tested to determine permeation of various fuels including CE10 (10 wt. % ethanol, 45 wt. % toluene, 45 wt. % iso-octane), CM15A (15 wt. % methanol and 85 wt. % oxygenated fuel), and methanol. Sample No. 4 described in Example 2 was utilized as a comparison material. Two samples of each material were tested.

Table 22, below provides the average sample thickness and effective area for the samples tested with each fuel.

TABLE 22

| Sample | Average Sample Thickness (mm) | Effective area (m$^2$) |
|---|---|---|
| CE10 | | |
| Aluminum blank - 1 | 1.50 | 0.00418 |
| Aluminum blank - 2 | 1.50 | 0.00418 |
| Sample No. 4 - 1 | 1.47 | 0.00418 |
| Sample No. 4 - 2 | 1.45 | 0.00418 |
| Sample No. 41 - 1 | 1.47 | 0.00418 |
| Sample No. 41 - 2 | 1.49 | 0.00418 |

TABLE 22-continued

| Sample | Average Sample Thickness (mm) | Effective area (m²) |
|---|---|---|
| Sample No. 42 - 1 | 1.47 | 0.00418 |
| Sample No. 42 - 2 | 1.46 | 0.00418 |
| Sample No. 43 - 1 | 1.45 | 0.00418 |
| Sample No. 43 - 2 | 1.47 | 0.00418 |
| CM15A | | |
| Aluminum blank - 1 | 1.50 | 0.00418 |
| Aluminum blank - 2 | 1.50 | 0.00418 |
| Sample No. 4 - 1 | 1.48 | 0.00418 |
| Sample No. 4 - 2 | 1.49 | 0.00418 |
| Sample No. 41 - 1 | 1.49 | 0.00418 |
| Sample No. 41 - 2 | 1.50 | 0.00418 |
| Sample No. 42 - 1 | 1.47 | 0.00418 |
| Sample No. 42 - 2 | 1.48 | 0.00418 |
| Sample No. 43 - 1 | 1.46 | 0.00418 |
| Sample No. 43 - 2 | 1.47 | 0.00418 |
| Methanol | | |
| Aluminum blank - 1 | 1.50 | 0.00418 |
| Aluminum blank - 2 | 1.50 | 0.00418 |
| Sample No. 4 - 1 | 1.49 | 0.00418 |
| Sample No. 4 - 2 | 1.49 | 0.00418 |
| Sample No. 41 - 1 | 1.49 | 0.00418 |
| Sample No. 41 - 2 | 1.51 | 0.00418 |
| Sample No. 42 - 1 | 1.48 | 0.00418 |
| Sample No. 42 - 2 | 1.47 | 0.00418 |
| Sample No. 43 - 1 | 1.47 | 0.00418 |
| Sample No. 43 - 2 | 1.48 | 0.00418 |

Figure 16:
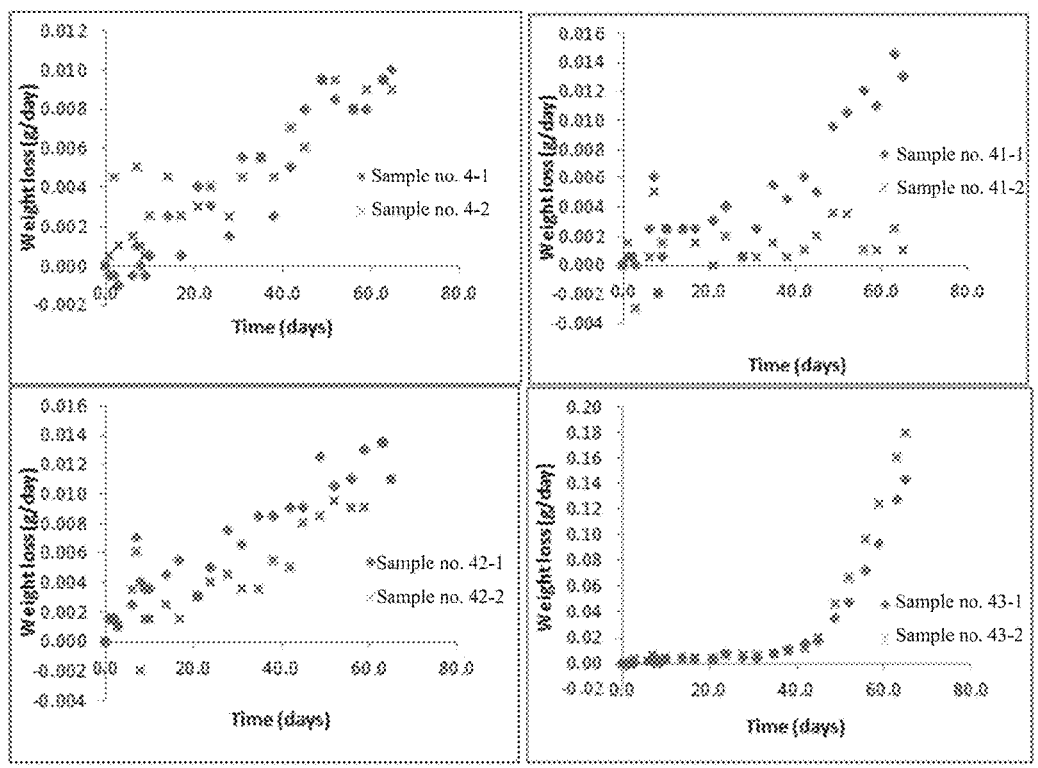
FIG. 16 illustrates the daily weight loss for testing samples in determination of permeation resistance of thermoplastic compositions to CE10.
Figure 17:
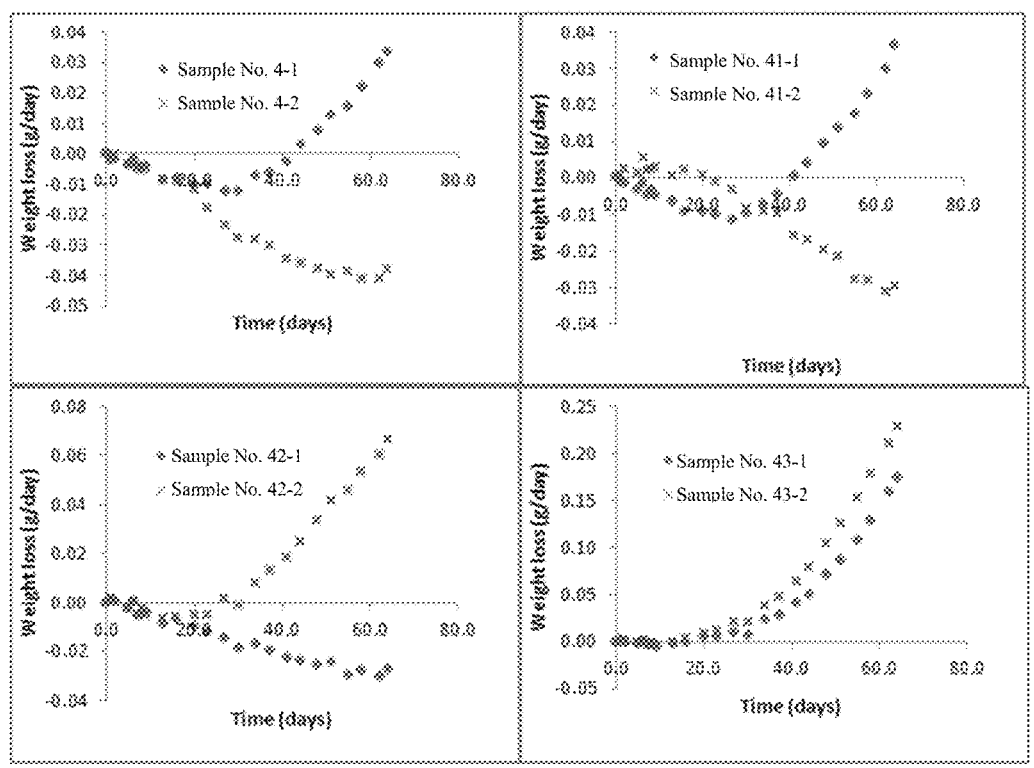
FIG. 17 illustrates the daily weight loss for testing samples in determination of permeation resistance of thermoplastic compositions to CM15A.
Figure 18:
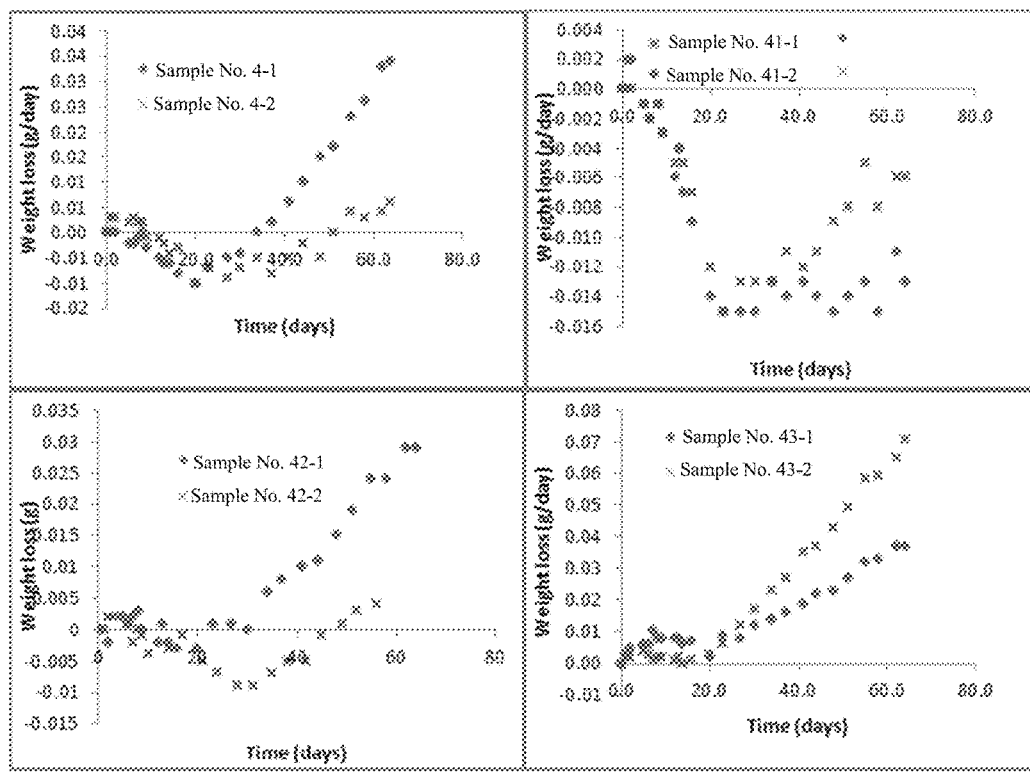
FIG. 18 illustrates the daily weight loss for testing samples in determination of permeation resistance of thermoplastic compositions to methanol.

The daily weight losses for each material and each fuel are shown in FIGS. 16-18. Specifically, FIG. 16 shows the daily weight loss for the samples during the permeation test of CE10, FIG. 17 shows the daily weight loss for the samples during the permeation test of CM15A, and FIG. 18 shows the daily weight loss for the samples during the permeation test of methanol.

The average permeation rates for each sample with each fuel are provided in Table 23. Note that Sample No. 43 takes a longer time to arrive at equilibrium, so the linear regression fitting was generated based on data between days 42 and 65 for this material, while the linear regress fitting was generated for the other materials between days 32 and 65. For methanol, the linear regression fitting was generated based on data between days 20 and 65, but with Sample No. 604, the methanol linear regression fitting was generated based on data between days 30 and 65. Some samples show negative permeability, which is because the weight loss of the sample was lower than that of the aluminum blank.

TABLE 23

| Sample | Normalized permeation (g-mm/day-m²) | Average Normalized permeation (g-mm/day-m²) | Permeation - 3 mm thickness | Average Permeation - 3 mm thickness |
|---|---|---|---|---|
| CE10 | | | | |
| Sample No. 4-1 | 0.06 | 0.05 ± 0.01 | 0.02 | 0.02 ± 0 |
| Sample No. 4-2 | 0.05 | | 0.02 | |
| Sample No. 41-1 | 0.07 | 0.04 ± 0.04 | 0.02 | 0.01 ± 0.01 |
| Sample No. 41-2 | 0.01 | | 0.00 | |
| Sample No. 42-1 | 0.06 | 0.06 ± 0 | 0.02 | 0.02 ± 0 |
| Sample No. 42-2 | 0.06 | | 0.02 | |
| Sample No. 43-1 | 2020 | 2.51 ± 0.43 | 0.73 | 0.84 ± 0.14 |
| Sample No. 43-2 | 2.81 | | 0.94 | |
| CM15A | | | | |
| Sample No. 4-1 | 0.49 | 0.18 ± 0.44 | 0.16 | 0.06 ± 0.15 |
| Sample No. 4-2 | -0.13 | | -0.04 | |
| Sample No. 41-1 | 0.50 | 0.11 ± 0.55 | 0.17 | 0.04 ± 0.18 |
| Sample No. 41-2 | -0.27 | | -0.09 | |
| Sample No. 42-1 | -0.13 | 0.27 ± 0.58 | -0.04 | 0.09 ± 0.19 |
| Sample No. 42-2 | 0.68 | | 0.23 | |
| Sample No. 43-1 | 2.04 | 2.29 ± 0.35 | 0.68 | 0.76 ± 0.12 |
| Sample No. 43-2 | 2.53 | | 0.84 | |
| Methanol | | | | |
| Sample No. 4-1 | 0.37 | 0.25 ± 0.18 | 0.12 | 0.08 ± 0.06 |
| Sample No. 4-2 | 0.13 | | 0.04 | |
| Sample No. 41-1 | 0.02 | 0.05 ± 0.05 | 0.01 | 0.02 ± 0.02 |
| Sample No. 41-2 | 0.08 | | 0.03 | |
| Sample No. 42-1 | 0.28 | 0.25 ± 0.05 | 0.09 | 0.08 ± 0.02 |
| Sample No. 42-2 | 0.21 | | 0.07 | |
| Sample No. 43-1 | 0.27 | 0.41 ± 0.2 | 0.09 | 0.14 ± 0.07 |
| Sample No. 43-2 | 0.55 | | 0.18 | |

The error was derived from the standard deviation of duplicates in each sample.

These and other modifications and variations to the present disclosure may be practiced by those of ordinary skill in the art, without departing from the spirit and scope of the present disclosure. In addition, it should be understood the aspects of the various embodiments may be interchanged, either in whole or in part. Furthermore, those of ordinary skill in the art will appreciate that the foregoing description is by way of example only, and is not intended to limit the disclosure.

What is claimed is:

1. A fuel line comprising a thermoplastic composition, the thermoplastic composition including a linear polyarylene sulfide containing less than about 1 wt. % of cross-linking units based on the total monomer units of the polyarylene sulfide, the thermoplastic composition further including a crosslinked impact modifier comprising the reaction product of a terephthalic acid crosslinking agent and an epoxy-functionalized impact modifier, the thermoplastic composition exhibiting a permeation to methanol at 40° C. of about 1 g-mm/m²-day or less as determined according to SAE Testing Method No. J2665, the fuel line being a tubular member and including a hollow passage therethrough in the axial direction of the tubular member for passage of a fluid.

2. The fuel line of claim 1, wherein the thermoplastic composition has
   a notched Charpy impact strength of greater than about 3 kJ/m² as determined according to ISO Test No. 197-1 at 23° C. and/or
   a notched Charpy impact strength of greater than about 8 kJ/m² as measured according to ISO Test No. 179-1 at a temperature of −30° C.

3. The fuel line of claim 1, wherein the fuel line is a multi-layer fuel line, an inner layer of the multi-layer fuel line comprising the thermoplastic composition.

4. The fuel line of claim 1, wherein the fuel line is a multi-layer fuel line comprising an inner layer, at least one intermediate layer, and an outer layer and wherein the at least one intermediate layer and/or the outer layer comprises the thermoplastic composition.

5. The fuel line of claim 1, wherein the polyarylene sulfide is polyphenylene sulfide.

6. The fuel line of claim 1, the thermoplastic composition further comprising a filler, a UV stabilizer, a heat stabilizer, a lubricant, a colorant, or a combination thereof.

7. The fuel line of claim 1, wherein a first section of the fuel line comprises the thermoplastic composition, the first section being adjacent to a second section of the fuel line that does not comprise the thermoplastic composition.

8. The fuel line of claim 1, wherein the thermoplastic composition is free of plasticizers.

9. The fuel line of claim 1, wherein the thermoplastic composition has an elongation at yield of greater than about 4.5% as determined according to ISO Test No. 527 at a temperature of 23° C. and a speed of 5 mm/min and/or a tensile modulus of less than about 3000 MPa as determined according to ISO Test No. 527 at a temperature of 23° C. and a speed of 5 mm/min.

10. The fuel line of claim 1, wherein the thermoplastic composition has a deflection temperature under load of greater than about 80° C. as measured according to ISO Test No. 75-2 at 1.8 MPa.

11. The fuel line of claim 1, wherein the thermoplastic composition has a flexural modulus of less than about 2500 MPa as measured according to ISO Test No. 178 at a temperature of 23° C. and a test speed of 2 mm/min.

12. The fuel line of claim 1, wherein the thermoplastic composition has a halogen content of less than about 1000 ppm.

13. The fuel line of claim 1, wherein the thermoplastic composition meets the V-0 flammability standard at a thickness of 0.2 millimeters.

14. The fuel line of claim 1, wherein the thermoplastic composition exhibits a permeation resistance to a fuel or a fuel source of less than about 3 g-mm/m$^2$-day as determined according to SAE Testing Method No. J2665.

15. The fuel line of claim 1, wherein the epoxy-functionalized impact modifier includes methacrylic monomer units.

16. The fuel line of claim 15, the epoxy-functionalized impact modifier further includes α-olefin monomer units.

17. The fuel line of claim 1, wherein the fuel line comprises a wall that includes the thermoplastic composition, the wall having a thickness of from about 0.5 to about 2.5 millimeters.

18. The fuel line of claim 1, wherein the fuel line is a single layer fuel line.

19. An automotive body that comprises the fuel line of claim 1, wherein the fuel line is coupled to a fuel tank.

20. The fuel line of claim 1, wherein the thermoplastic composition exhibits a tensile elongation at break of about 50% or more as determined in accordance with ISO Test No. 527 at a temperature of 23° C. and at a speed of 50 mm/min.

21. The fuel line of claim 19, wherein the thermoplastic composition exhibits a tensile elongation at break of about 70% or more.

* * * * *